United States Patent
Argenti et al.

(10) Patent No.: US 10,459,764 B2
(45) Date of Patent: *Oct. 29, 2019

(54) STATELESS INSTANCE BACKED MOBILE DEVICES

(71) Applicant: Amazon Technologies, Inc., Seattle, WA (US)

(72) Inventors: Marco Argenti, Mercer Island, WA (US); Khawaja Salman Shams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,645

(22) Filed: Jun. 26, 2017

(65) Prior Publication Data

US 2017/0308401 A1    Oct. 26, 2017

Related U.S. Application Data

(63) Continuation of application No. 14/834,364, filed on Aug. 24, 2015, now Pat. No. 9,690,622.

(51) Int. Cl.
*G06F 9/455* (2018.01)
*G06F 9/50* (2006.01)

(52) U.S. Cl.
CPC ...... *G06F 9/5027* (2013.01); *G06F 2209/509* (2013.01); *G06F 2209/549* (2013.01)

(58) Field of Classification Search
None
See application file for complete search history.

(56) References Cited

U.S. PATENT DOCUMENTS

| | | |
|---|---|---|
| 6,249,836 B1 | 6/2001 | Downs et al. |
| 7,805,706 B1 | 9/2010 | Ly et al. |
| 8,621,069 B1 | 12/2013 | Tompkins |
| 8,788,855 B2 | 7/2014 | Cong et al. |
| 9,256,467 B1 * | 2/2016 | Singh .................. G06F 9/5055 |
| 9,449,346 B1 | 9/2016 | Hockey et al. |

(Continued)

FOREIGN PATENT DOCUMENTS

WO    2014047073 A1    3/2014

OTHER PUBLICATIONS

He et al., "Elastic Application Container: A Lightweight Approach for Cloud Resource Provisioning," 26th IEEE International Conference on Advanced Information Networking and Applications, Mar. 26, 2012, pp. 15-22.

(Continued)

*Primary Examiner* — Gregory A Kessler
(74) *Attorney, Agent, or Firm* — Davis Wright Tremaine LLP

(57) ABSTRACT

A service provider may provide a companion container instance associated with a mobile device in order to facilitate operation of the mobile device. The companion container instance and the mobile device may be associated in a database operated by the service provider. Furthermore, the companion container instance may execute various operations on behalf of the mobile diver based at least in part on a task definition indicating a software function to be executed by the companion container instance. The software function configured to execute the various operations on behalf of the mobile device.

20 Claims, 18 Drawing Sheets

(56) References Cited

U.S. PATENT DOCUMENTS

| | | |
|---|---|---|
| 9,753,669 B2 | 9/2017 | Ben-Shaul et al. |
| 2004/0040025 A1 | 2/2004 | Lehtinen |
| 2004/0054997 A1 | 3/2004 | Katragadda et al. |
| 2006/0136928 A1 | 6/2006 | Crawford et al. |
| 2006/0168575 A1 | 7/2006 | Bhatt et al. |
| 2006/0168581 A1 | 7/2006 | Goger et al. |
| 2007/0118657 A1 | 5/2007 | Kreitzer et al. |
| 2007/0245331 A1 | 10/2007 | Daynes et al. |
| 2010/0131792 A1 | 5/2010 | Herrod |
| 2010/0153941 A1 | 6/2010 | Borissov et al. |
| 2010/0318999 A1 | 12/2010 | Zhao et al. |
| 2011/0022633 A1 | 1/2011 | Bernosky et al. |
| 2013/0029641 A1 | 1/2013 | Hickie |
| 2013/0073600 A1 | 3/2013 | Jenkins et al. |
| 2013/0109371 A1 | 5/2013 | Brogan et al. |
| 2013/0191527 A1 | 7/2013 | Ashok et al. |
| 2013/0297964 A1 | 11/2013 | Hegdal et al. |
| 2014/0007214 A1 | 1/2014 | Qureshi et al. |
| 2014/0149986 A1 | 5/2014 | S M et al. |
| 2014/0153481 A1 | 6/2014 | Draznin et al. |
| 2014/0173058 A1 | 6/2014 | Twitchell, Jr. |
| 2014/0189388 A1 | 7/2014 | Lynar et al. |
| 2014/0304356 A1 | 10/2014 | Allen, Sr. et al. |
| 2014/0344446 A1 | 11/2014 | Rjeili et al. |
| 2015/0331635 A1 | 11/2015 | Ben-Shaul et al. |
| 2016/0034295 A1 | 2/2016 | Cochran |
| 2016/0048399 A1 | 2/2016 | Shaw |
| 2016/0062623 A1 | 3/2016 | Howard et al. |
| 2016/0092248 A1 | 3/2016 | Shani et al. |
| 2016/0216991 A1 | 7/2016 | Ansari et al. |

OTHER PUBLICATIONS

International Organization for Standardization/ International Electrotechnical Commission, "Information technology—Trusted Platform Module—Part 1: Overview," International Standard, ISO/IEC 11889-1(E), May 15, 2009, 20 pages.

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted Platform Module—Part 4: Commands," International Standard, ISO/IEC 11889-4:2009(E), 254 pages.

International Search Report and Written Opinion in International Patent Application No. PCT/US2015/050513, dated Feb. 16, 2016, 22 pages.

International Search Report and Written Opinion dated Feb. 4, 2016, International Patent Application No. PCT/US2015/059983, 12 pages.

Soltesz et al., "Container-based operating system virtualization: a scalable, high-performance alternative to hypervisors," ACM SIGOPS Operating Systems Review 41(3):275-287, Mar. 2007.

Trusted Computing Group, "TPM Main, Part 1 Design Principles," Specification Version 1.2, Level 2 Revision 103, Jul. 9, 2007, 182 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 3 Commands," Specification Version 1.2, Revision 116, Mar. 1, 2011, 339 pages.

Van et al., "SLA-aware Virtual Resource Management for Cloud Infrastructures," IEEE Ninth International Conference on Computer and Information Technology, Oct. 11, 2009, pp. 357-362.

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

Xavier et al., "Performance evaluation of container-based virtualization for high performance computing environments," Parallel, Distributed and Network-Based Processing (PDP), 2013 21st Euromicro International Conference, Feb. 2013, pp. 233-240.

Zhao et al., "Experimental study of virtual machine migration in support of reservation of cluster resources," Proceedings of the 2nd international workshop on Virtualization technology in distributed computing, Nov. 2007, pp. 1-8.

Pikkarainen et al., "The impact of agile practices on communication in software development," Empirical Software Engineering 13(3):303-37, Jun. 1, 2008.

Ramamritham, "Allocation and scheduling of precedence-related periodic tasks," IEEE Transactions on Parallel and Distributed Systems 6(4):412-420, Apr. 1995.

Thiele et al., "Embedded Software in Network Processors—Models and Algorithms," Lecture Notes in Computer Science 2211:416-34, Oct. 8, 2001.

\* cited by examiner

STATELESS INSTANCE BACKED MOBILE DEVICES

CROSS REFERENCE TO RELATED APPLICATION

This application is a continuation of U.S. patent application Ser. No. 14/834,364, filed Aug. 24, 2015, now U.S. Pat. No. 9,690,622, entitled "STATELESS INSTANCE BACKED MOBILE DEVICES," the disclosure of which is hereby incorporated herein in its entirety.

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added or removed from a large pool provided by a computing resource provider as needed and depending on their needs. Additionally mobile devices are quickly outgrowing other form factors and the development of mobile applications is growing and becoming more ambitious.

DETAILED DESCRIPTION

Figure 1:
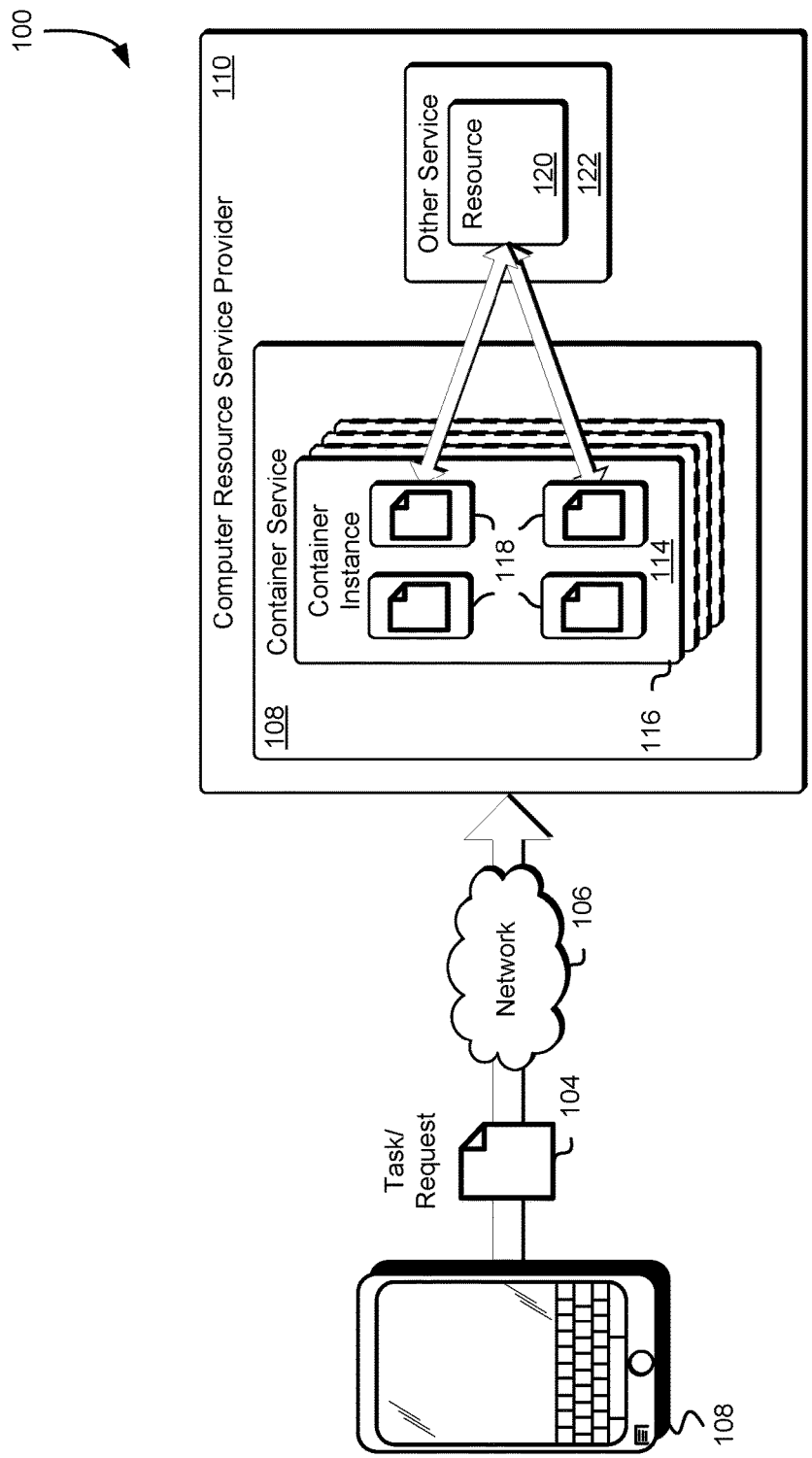
FIG. 1 illustrates an example of a customer's mobile device interacting with a container service in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for mobile devices and applications executed by mobile devices using container instances. A computing resource service provider may create clusters of software function instances for running software functions for customers of a computing resource service provider. The software functions may execute various tasks on behalf of customers mobile devices. The software function instances may be virtual machine instances configured to support containerization, and the software functions may be registered or deregistered from the cluster as needed to fit the needs of the customer's mobile devices. Each software function instance may contain a container agent, which may be an application configured to, when executed by one or more processors of a computer system, perform various tasks with software functions and the software function instances, including registering container instances, deregistering container instances, starting tasks, stopping tasks, providing task statuses, signaling task heartbeats, and reporting task events. Software functions may include data and one or more processes that, when executed in a computer system instance configured to support containerization, may be isolated from other processes running within the same computer system instance.

A mobile device may be associated with a container instance or software function referred to herein as a companion container instance or companion software function. The companion container instance may be used to consolidate traffic emanating from the associated mobile device and received by the associated mobile device. For example, the companion container instance may receive notifications on behalf of the mobile device and push the notifications to the mobile device when able to do so. This provides particular utility in situations where the mobile device has an intermittent connection to the Internet or other network. The companion container instance may be configured with a stable connection to the Internet or other network the mobile device may receive communications on. In some embodiments, the companion container instance may optimize the connection between the mobile device and one or more networks. For example, the companion container instance may pool connections between the mobile device in order to handle communication, absorb intermittent connectivity between the devices, and coalesce communication protocol handshakes and other types of connections on behalf of the mobile device.

In some embodiments, data transmitted between the mobile device and the companion container instance may be compressed. For example, the companion container instance may receive an image on behalf of the mobile device and compress the image to a size optimal for the display of the mobile device. In another example, the companion container instance may compress the image as a result of the mobile device being on a slow connection, allowing the mobile device to receive the image sooner. Additionally, the companion container instance may perform various operations and/or functions on behalf of the mobile device, for example, the companion container instance may automatically follow Hypertext Transfer Protocol (HTTP) redirects. The various operations and/or functions may be included in software functions defined in various tasks, described in greater detail below. For example, the software function may include serialized executable code, such as JavaScript®, configured to execute the various operations and/or functions. The functions and/or operations performed by the companion container instance (or component thereof, such as the software function) on behalf of the mobile device may minimize the amount of data sent and received from the mobile device itself, while also conserving battery power of the mobile device by optimizing use of the radio, the processor, the memory, and other portions of the mobile device. Furthermore, the companion container instance may provide continuity of communication between the mobile device and other devices, such as a webserver operated by a content provider.

For example, if the mobile device begins to load a webpage of the content provider, and loses connectivity and then re-establishes the connection at some point in time later, the companion container instance may maintain the connection during connection loss by the mobile device and eliminate connection time-out artifacts. Various other service and computer systems may communicate with the companion container instance without detecting that the mobile device has lost connectivity because the companion container instance may receive communications on behalf of the mobile device. The companion container instance may, in some embodiments, operate a web server on behalf of the mobile device. Packets and other information transmitted to the mobile device may be routed to the companion container instance aggregated and accepted on behalf of the mobile device. This may eliminate the need of the mobile device to poll multiple connections in order to receive notification and other information designated for the mobile device. The companion container instance may establish a single connection with the mobile device and transmit all of the data directly to the mobile device over the established connection.

The companion container instance may execute a set of applications on behalf of the mobile device aggregating connections between the set of applications and other devices including other companion container instances associated with other mobile devices. For example, a messaging application on a first mobile device may communicate with a second mobile device by causing the companion container instance associated with the first mobile device to transmit a message to a second companion container instance associated with the second mobile device. Additionally, the companion container instance may process data for the mobile device. For example, the mobile device may capture an image using a camera or similar sensor connected to the mobile device, the mobile device may then transmit the captured image to the companion container instance for processing, such as image enhancement or stitching multiple images into a single panoramic image. In some embodiments, a software development kit (SDK) may be exposed to developers in order to enable developers to utilize companion container instances, software functions, and mobile devices as a single entity (i.e., a single logical unit). For example, a developer may develop a mobile application using the SDK, and the SDK may be configured to determine which portion of the application is executed by the mobile device, and which portion is executed by the companion container instance using software functions based on the capabilities or operation performed by the particular portion of the application. In various embodiments, the developer may indicate which portion of the application is to be executed by the mobile device or companion container instance. For example, the developer may tag an application programming interface (API) call or portion of the application as executed by the mobile device or executed by the companion container instance. Furthermore, the companion container instance or the mobile device may dynamically determine which portions of the application are executed by the companion container instance or mobile device. For example, if the mobile device is low on battery power a majority of the processing for an application may be performed by the companion container instance.

FIG. 1 illustrates an aspect of an environment 100 in which an embodiment may be practiced. As illustrated in FIG. 1, the environment 100 may include a customer's mobile device 108 that sends a task definition file 104 for software functions 118 along with a request to launch tasks through a network 106 to a container service 112 of a computing resource service provider 110. A scheduler, such as the scheduler described in greater detail below in connection with FIG. 2, may determine into which container instance 114 of a cluster 116 of container instances that the software functions 118 specified in the task definition file 104 should be launched. In some embodiments, the software functions may be configured to share resources 120 provided by other services 122 of the computing resource service provider 110, such as a storage volume provided by a block-level data storage service of the computing resource service provider 110.

The mobile device 108 may be any suitable computer system, mobile phone, smartphone, tablet, portable computer or combination thereof capable of communicating with the container service 112 through a service provider 110 The mobile device 108 may contain multiple applications, task 104, and software functions in memory. In some embodiments, a single companion container instance 114 may be instantiated per mobile device 108. Alternatively, the service provider 110 may provide a fleet or cluster of companion container instances 116 including multiple Internet Protocol (IP) addresses and a Network address translation (NAT) gateway configured to route traffic to the IP addresses. In this scenario, each mobile device 108 may be assigned a particular IP address and traffic for the particular mobile device 108 or may be directed to the corresponding companion container instance 114 of the cluster 116, based at least in part on information provided by the NAT gateway. In various embodiments, the container service 112 or other service 120 may contain the task and/or software function to be executed by the container instance 114 on behalf of the mobile device 108. In such embodiments, the mobile device 108 may transmit a request to the computing resource service provider to execute one or more tasks and/or software functions indicated in the request.

Furthermore, the resources of the mobile device 108 may be made available to other users and/or devices. For example, the mobile device 108 may utilize the container instance 114 to provide a virtual presence for other users, and these other users may then interact with the mobile device 108 through the virtual presence provided by virtual presence through the container service 112. The mobile device 108 may communicate with the container service 112 of the computing resource service provider 110 through the network 106, which may be a communication network, such as the Internet, an intranet, an internet service provider (ISP) network and/or some other such network as described below.

In some examples, a "task definition" or "task definition file" may refer to a file specifying a set of linked containers (i.e., a set of containers that, when running on a host computing system, are associated with each other) that are assigned to start as a group. The task definition file 104 may further specify disk and network locations that the software functions 118 are able to share on a single physical machine. The task definition file 104 may then be utilized for launching the set of containers 118. In some implementations, the task definition file 104 may define and link software functions 118 spread across multiple physical machines. One task definition file 104 may contain and schedule many tasks. In some examples, a "task" may refer to an instantiation of a task definition file 104, and may consist of one or more software functions 118. Tasks may be modified by applying a new task definition to the task.

The task definition file 104 may contain all the information needed to place software functions 118 in containers 114 of a cluster 116, and the cluster 116 may be managed through application programming interface calls.

An example of a task definition may be:

```
{       'db':
        {
                'Image' : 'forest/postgresql',
                'Ports' : ['5432'],
                'CPU' : 1000,
                'Memory' : 1073741824
        },
        'web' :
        {
                'Image' : 'hub.web.com/rails:latest',
                'Ports'  : ['8000:8000'],
                'links'  : ['db'],
                'CPU' : 1000,
                'Memory' : 1073741824
        }
}
```

The example task definition specifies that a first task, entitled "db," has a software image located at the path "forest/postgresql." The first task is allocated processing capacity of 1,000 and 1 gigabyte of memory, and the first task uses port 5432. Similarly, the task definition also specifies that a second task, entitled "web," has a software image located at the path "hub.web.com/rails:latest." The second task is allocated processing capacity of 1,000 and 1 gigabyte of memory, and the second task uses ports 8000:8000. The task definition notes that the second task ("web") is allowed to link to the first task ("db").

The container service 112, described in greater detail below in connection with FIG. 2, may be a service provided by the computing resource service provider 110 to allow the mobile device 108 to execute the containers 118 within the cluster 116. The computing resource service provider 110, described in greater detail below, may provide one or more computing resource services to its customers individually or as a combination of services of a distributed computer system. The one or more computing resource services of the computing resource service provider 110 may be accessible over the network 106 and may include services such as virtual computer system services, block-level data storage services, cryptography services, on-demand data storage services, notification services, authentication services, policy management services, task services and/or other such services. Not all embodiments described include all of the services described and additional services may be provided in addition to, or as an alternative to, services explicitly described.

The mobile devices 108 supported by the container service 112 of the computing resource service provider 110 may communicate with one or more of the services, including the container service, via an interface, which may be a web services interface or any other type of customer interface. Each service provided by a computing resource service provider may have its own interface and subsets of the services may have corresponding individual interfaces in addition to, or as an alternative to, a common interface.

In some examples, a "container instance" may refer to a computer system instance (virtual or non-virtual, such as a physical computer system running an operating system) that is configured to launch and run software functions 118. Thus, the container instance 114 may be configured to run the software functions 118 within the container instance 114 in accordance with the task definition file 104 provided by the mobile device 108 or other entity, such as a software developer, described above. One or more container instances 114 may comprise a cluster 116. In some examples, "cluster" may refer to a set of one or more container instances 114 that have been registered with the cluster, described in greater detail below in connection with FIG. 2. Thus, the container instance 114 may be one of many different container instances 114 registered with the cluster 116, and the other container instances of the cluster 116 may be configured to run the same or different types of software functions 118 as the container instance 114. The container instances 114 within the cluster 116 may be of different instance types or of the same instance type, and the mobile device 108 may have access to or interact with more than one cluster 116. Thus, the mobile device 108 may launch one or more clusters 116 and then manage user and application isolation of the software functions 118 within each cluster 116 through application programming interface calls.

A software function 118 may be a lightweight virtualization instance running under a computer system instance that allows processes and data used by the processes within the software function 118 to be isolated from other processes running in the same computer system instance or container instance 114. Thus, the software functions 118 may each be virtualization instances running under an operating system of the container instance 114 and executing in isolation from each other. Each of the software functions 118 may have their own namespace, and applications running within the software functions 118 are isolated by only having access to resources available within the container namespace. Thus, software functions 118 may be an effective way to run one or more single applications within their own namespace. A container encapsulation system allows one or more software functions 118 to run within a single operating instance without overhead associated with starting and maintaining virtual machines for running separate user space instances. An example container encapsulation system is the Docker container engine. For example, an application may consist of several software functions 118, these software functions 118 may be configured to perform operations on behalf of mobile devices 108. The software functions 118 are executed in a container instance 114, as described above, using computing resources of a computing resource service provider and thereby reducing or eliminating load on the mobile device 108. Software developer may develop applications and software functions 118 based at least in part on computing resources available to container instances 114 and not be limited to computing resources available to mobile devices 108.

The software functions 118 may be launched to have only specified resources from resources allocated to the container instance 114; that is, a software function 118 may be launched to have a certain amount of memory and to not utilize more than a specified amount of processing power. The resource allocation for the software functions 118 may be specified in the task definition file 104. Multiple software functions 118 may be running simultaneously on a single host computer or host container instance, and the resources of the host can be allocated efficiently between the software functions 118, container instances 114, and/or clusters 116 of container instances 114. In some embodiments, a host may support running software functions 118 in container instances 114 from only one mobile device 108. In other embodiments, a single host may allow multiple mobile devices 108 to have container instances 114 running on the host. In the latter case, the container service 110 may provide security to ensure that the mobile devices 108 are unable to access containers, clusters, or container instances of the others.

Different types of tasks may have different resource requirements and may have different lifespans. Thus, the software functions 118 may be dynamically scheduled to run by a scheduler service in the container service 110 independent of an underlying operating system of the container instance 114, and as such, the underlying operating system of the container instance 114 may be very basic. Alternatively, the containers 118 may be scheduled to run by a scheduler installed within the container instance 114 of the cluster 116.

The other services 122 may be services such as services described above of the computing resource service provider described in greater detail below. Likewise, the other resources 120 may include resources that can be shared between virtualized instances, such as a storage volume of a block-level data storage service.

Figure 2:
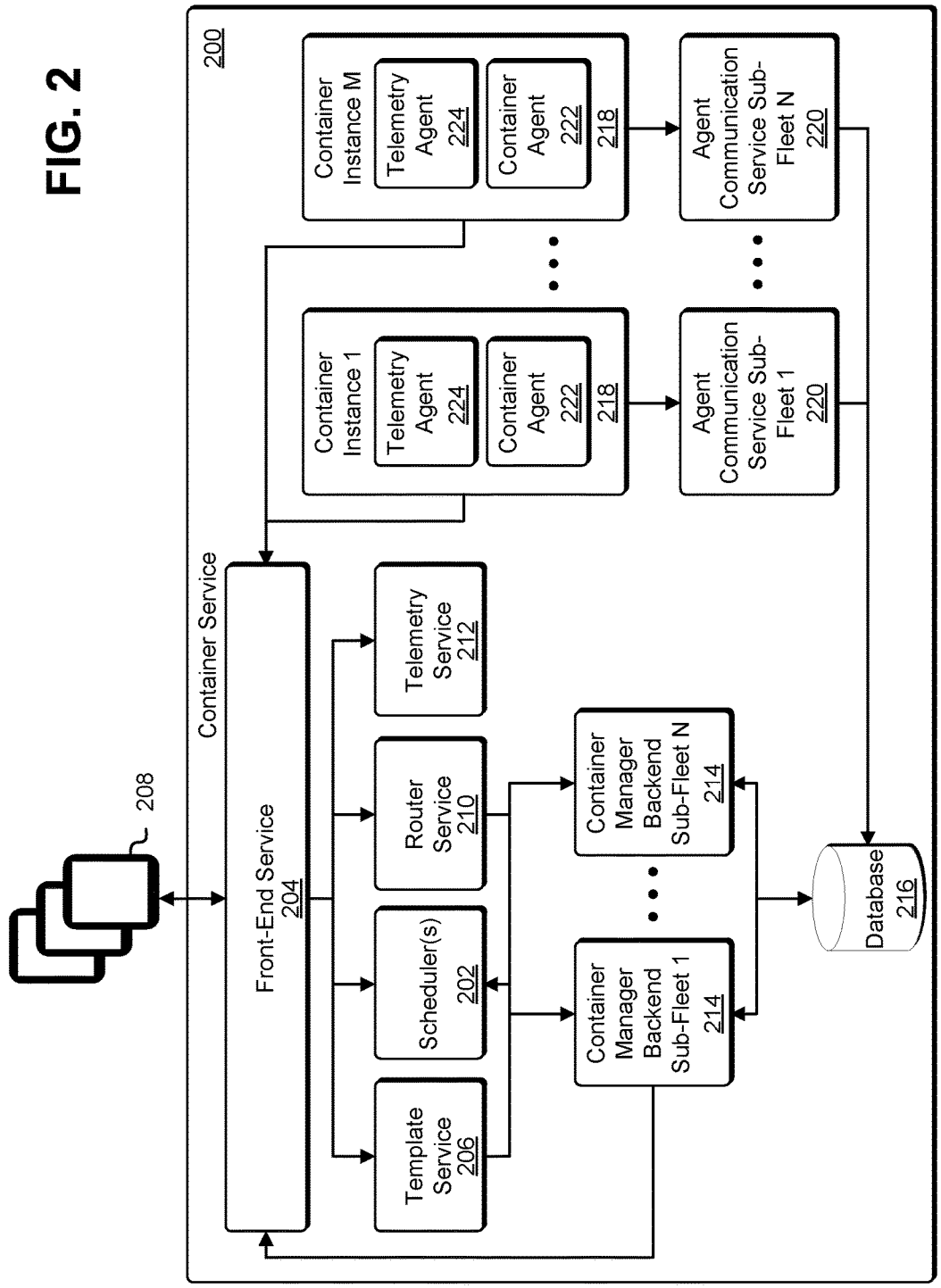
FIG. 2 illustrates an example of a container service in accordance with an embodiment.

FIG. 2 illustrates an example container service 200 of an embodiment of the present disclosure. As illustrated in FIG. 2, the environment may include mobile devices 208 of a computing resource service provider communicating through a front end service 204 manage one or more containers within one or more container instances 218. As noted, a container encapsulation system provided by or interfaced to the container service 200 may allow a customer, mobile device 208, or software developer to configure one or more applications within a software function of an operating system that supports containers. The running processes and resources within the software function may be isolated from other processes of the parent container instance and from the running processes and resources within other software functions of the same host system. The mobile device 208 may specify the amount of memory and processing capacity allocated to the software function. The base container and the applications and data within it may then be packaged as an image. In some examples, an "image" may refer to an entire copy of a particular state of the base container at the time the image was generated. The image thereafter may be used to launch one or more identical software functions, each of which may be assigned the specified amount of resources and may be isolated from each other. The software functions may be launched on the same or different physical machines and each software function may be expected to run in exactly the same way as the base container.

Each of the container instances 218 may be configured to contain a pair of agents, the container agent 222 and a telemetry agent 224, that may allow containers within the container instance to be managed, may provide cluster state information, and may enable logging and telemetry data collection. The container service 200 may be comprised of a set of services, including a template service 206, one or more schedulers 202, a router service 210, and a telemetry service 212. Because the container service 200 may be configured as a multitenant service (i.e., the resources of the container service 200 may serve multiple customers concurrently), and because the services provided by the container service 200 exist outside and separate from the container instances 218, the mobile device 208 need not install individual software applications within their respective container instances 218 to provide the functionality afforded by the services. The mobile device 208 may utilize the functionality provided by these services by making web service application programming interface function calls through the front end service 204, which may be configured to receive requests from mobile device 208 and forward the requests to the appropriate service.

As noted customer may launch one or more clusters and then manage user and application isolation within each cluster through the front-end service 204. For example, the mobile device 208 may specify that "instances 1-10" should comprise a first cluster and "instances 11-15" should comprise a second cluster along with particular tasks to be executed by each cluster. Thereafter, when the mobile device 208 submits a launch request for a container, the mobile device 208 may specify whether the container should be launched in the first cluster or the second cluster or the container service 200 may determine a cluster to execute the software function based at least in part on the particular tasks for each cluster specified by the mobile device 208.

Each cluster may have a cluster identifier (ID) that uniquely distinguishes the clusters from each other. Clusters may be specified by referring to their respective cluster ID. The mobile device 208 may use different clusters for different types of tasks. For example, the mobile device 208 may use a first cluster for launch services and may use a second cluster for executing batch jobs. The instances in the first cluster may have been optimized for running server, and the instances of the second server may have been optimized for submitting short-lived transient jobs, like batch jobs.

Available application programming interface function calls for clusters may include CreateCluster, DescribeCluster, ListClusters, and DeleteCluster. The CreateCluster application programming interface call may cause a cluster to be created. In some cases, after the cluster is created, the front-end service 204 may provide the mobile device 208 with the cluster ID of the newly created cluster. The cluster ID may allow the mobile device 208 to register container instances with the cluster, such as by passing the cluster ID as a parameter to a RegisterContainerInstance application programming interface call. Additionally or alternatively, the mobile device 208 may specify one or more existing container instances belonging to the mobile device 208 as parameters to the CreateCluster application programming interface call to cause the one or more existing container instances to be registered with the cluster in concurrence with creating the cluster. Similarly, in some cases, the mobile device 208 may specify, in parameters of the CreateCluster application programming interface call, a quantity of container instances to be created and registered with the cluster upon creation of the cluster.

Once a cluster is created and running, the DescribeCluster application programming interface call may be used by the mobile device 208 or applications to request information about a cluster. Information returned in response to the DescribeCluster application programming interface call may include a list of what applications are running in the cluster, resources available to the cluster and their types. Information returned from the DescribeCluster application programming interface call may then be used as parameters for a StartTask application programming interface call to launch a task within the described cluster.

The scheduler 202 may be configured to launch tasks within the described cluster. Alternatively, the mobile device 208 may implement their own scheduler, rather than the scheduler 202, and use the information retrieved by the DescribeCluster application programming interface call in conjunction with the placement logic of the customer scheduler to make placement decisions for scheduled tasks. The customer or software developer may design and/or upload a placement algorithm to be used by his/her own scheduler, or may select from a list of possible placement algorithms provided to the mobile device 208 by the computing resource service provider. The container service 200 may determine, based on available resources, whether to accept or reject placement decisions made by the mobile device's 208 scheduler.

The scheduler 202 may be a multitenant service configured to optimally schedule a set of tasks to run with a cluster. In this way, the mobile device 208 need not choose where the tasks should be executed. The placement scheme of the scheduler 202 may be configured to distribute tasks evenly over the cluster (e.g., round robin fashion, stochastic distribution scheme, etc.), may be configured to distribute tasks based on a current or projected resource consumption by the cluster, in order to make the most efficient use of available resources. The scheduler 202 may distribute tasks based at least in part on security rules, security groups, and/or security roles, have affinity, and anti-affinity. For example, tasks within a certain security group may be configured to be launched on the same container instance whenever possible or practicable, or, conversely, may be scheduled to be launched in separate container instances 218. As another example, tasks may be assigned to certain security groups or designated to have certain security roles, and, based on the particular security group assigned or security role designated, a task may be assigned to run in a specific cluster or specific cluster instances or may have priority for resources over other tasks. As noted, in some embodiments, the mobile device 208 may alternatively implement their own schedulers for task management rather than using the scheduler 202.

In some cases, software functions may be configured to compete for resources and, in cases of conflict, software functions associated with certain security roles may have priority over other containers. Note that in all cases, the placement scheme may take the available resources in the container instances 218 and the resource requirements of the software function into account. For example, a container instance 218 may not be selected for particular tasks if the particular tasks have resource requirements exceeding the available resources in the container instance 218. In some implementations, however, the container instance 218 may still be selected but launching of the particular tasks may be delayed until enough resources become available within the container instance 218 to support running the particular tasks.

Container instances 218 may also be configured to utilize other resources provided by the computing resource service provider. For example, each container instance 218 may be configured with a virtual network interface to allow the container instance 218 to communicate through the virtual network to other container instances 218 and/or other resources of the computing resource service provider. Likewise, security credentials may be assigned on a per-container instance 218 or per-software function basis so that container instances 218 have their own security credentials to access the other resources provided by the computing resource service provider. Additionally, the container service 200 may be configured to integrate with a load-balancing service to load-balance workloads directed at the container instances 218. For example, the mobile device 208 may present a list of internet protocol addresses associated with virtual networks of the mobile device's 208 containers and/or companion instances to a load-balancer of the load-balancing service and instruct the load-balancer to balance workloads between the internet protocol addresses. In addition, the container service 200 may be integrated with an auto-scaling service to allow resources utilized by the container instances 218 to be dynamically adjusted as needed.

For example, the mobile device 208 may implement multiple schedulers for a single cluster, and the multiple schedulers determine for which container instances 218 within the cluster to launch software functions. The multiple schedulers may compete with each other according to a placement scheme, such as by using an optimistic concurrency control method for determining where to launch containers. For example, each scheduler using optimistic concurrency may assume that, in general, container instances 218 will not interfere with each other, and in a situation where one container instance or software function has modified data that another container instance or software function has read, the reading container instance or software function may restart and re-read the modified data. In some implementations, a meta-scheduler may be configured to run hierarchically on top of one or more schedulers, and the meta-scheduler may decide where to launch the batch jobs. In some cases, a scheduler 202 may be configured to maximize available resources. For example, a cluster may be utilized primarily for running long-running services, and a need arises for running one or more short-lived batch jobs. In such an example, a scheduler configured to maximize available resources may look for an instance with just enough processing power to support the batch jobs as a best-fit location for the batch jobs. Alternatively, the scheduler may look for an instance utilizing the least of its processing power and schedule the batch jobs with this instance.

The cluster may be managed through application programming interface calls made to the front-end service 204. For example, an application programming interface call could be made to request a list of what clusters are available and what containers may be running on which clusters. The ListClusters application programming interface call may list all clusters to which a customer has access. The DeleteCluster application programming interface call may delete a specified cluster.

Available application programming interface function calls for container instances 218 may include RegisterContainerInstance, DescribeContainerInstance, and DeregisterContainerInstance. A RegisterContainerInstance application programming interface call may be used by a container agent of a container instance 218 to register the container instance 218 with a cluster manager once the container instance 218 is instantiated. The cluster manager may then refer to the registered container instances 218 when determining into which container instance 218 the software functions should be launched. The DescribeContainerInstance application programming interface call may return information about the container instance 218, including resources available to the container instance 218 and running tasks within the container instance 218.

Because software functions may be run in any available container instance 218 with sufficient resources in the cluster, software functions may be scaled up or down within the cluster as needed, provided enough container instances are available. If the number of container instances 218 in a cluster is insufficient, additional container instances 218 may be created and registered to the cluster. If an overabundance of container instances 218 exists in the cluster, some container instances 218 may be deregistered from the cluster. The DeregisterContainerInstance application programming interface call may be used to deregister, from a specified cluster, a container instance 218 that was registered using the RegisterContainerInstance application programming interface call.

Available application programming interface function calls for task definitions may include RegisterTaskDefinition, DescribeTaskDefinition, ListTaskDefinitions, and DeregisterTaskDefinition. The RegisterTaskDefinition application programming interface call may be used to register a task definition for launching tasks. The DescribeTaskDefinition application programming interface call may be used to return information about the task definition, including the contents of the task definition file. The ListTaskDefinitions application programming interface call may return a list of task definitions available to a customer, or may return a list of task definitions associated with a particular cluster ID or container instance ID. The DeregisterTaskDefinition application programming interface call may deregister a task definition that was registered using the RegisterTaskDefinition application programming interface call.

Application programming interface function calls for tasks may include StartTask, DescribeTask, ListTasks, and StopTask. The mobile device 208 may pass a template or task definition file (or their respective identifiers) as parameters to the StartTask application programming interface call and may further specify a container instance 218 or cluster to launch one or more tasks within the container instance 218 or cluster. For example, the mobile device 208 may have obtained one or more container instance IDs of a cluster in response to a DescribeCluster application programming interface call, and may specify to execute a task definition file on the one or more identified container instances 218. If the mobile device 208 is running tasks directly, they may call the StartTask application programming interface and specify the container instance 218 to launch into. Alternatively, the scheduler 202 may use the StartTask application programming interface to launch tasks. In addition, the mobile device 208 may configure their own scheduler to use the StartTask application programming interface to launch tasks.

The scheduler 202 or mobile device-installed scheduler may also be configured to start tasks within a task definition file, and determine where to place the tasks within the cluster. For example, the scheduler 202 may determine to distribute tasks evenly between the container instances 218 of the cluster, distribute tasks in some chi-squared distribution, or may distribute tasks among container instances 218 of a cluster according to some other heuristic or set of constraints. Parameters passed to the StartTask application programming interface call may specify, such as by passing a task definition file outlining multiple tasks, that multiple tasks should be started. In some implementations, the mobile device 208 may, rather than specifying a single cluster or container instance 218, a list of clusters or container instances 218 and the scheduler 202 may determine in which of the container instances 218 to execute the tasks.

The DescribeTask application programming interface call may be used to return information about a running tasks from the container agents 222, including information about allocated resources, age, and running state. The ListTasks application programming interface call may be used to return a list of all tasks running, or a list of all tasks running in a specified cluster or container instance 218. The StopTask application programming interface call may be used to command the container agents 222 to stop specified running tasks started using the StartTask application programming interface call.

The container service 200 may interact with an authentication system of the computing resource service provider to authenticate application programming interface calls made to the front end service 204. In some embodiments, separate security groups and security roles may be configured and assigned to different containers on a single host. The container service 200 may also be configured to launch containers and container instances 218 within a virtual private cloud.

In some embodiments, the container instances 218 may be configured to attach to other services of the computing resource service provider, such as block-level data storage service and/or on-demand data storage services. In some cases, container instances 218 may be configured to share attached services with other container instances 218. As an example, a container instance 218 of the mobile device 208 may be mapped to a block-level storage volume of a block-level storage service of a computing resource service provider, and the software functions within the instance may each be configured to be able to read from and/or write to the block-level storage volume. In some examples, the block-level storage volume may be shared between multiple container instances, such as all container instances within a cluster or multiple clusters, such that container instances 218 within the cluster or clusters may all be able to share the block-level storage volume with their running containers. As another example, a container instance 218 may be mapped to 20 different block-level storage volumes, but only two of the block-level storage volumes are specified for the software functions.

The template service 206 may be configured to allow the mobile device 208 to define a template for their software functions and/or container instances. In some examples, a "template" may refer to a script or set of metadata that may define a group of containers instances 218; e.g., the number of containers instances, their types, their components, their relationships to other containers instances, information describing associated instances, and other metadata. Templates may also specify groups of software functions or container instances to be launched in coordination. The template service 206 may receive templates from the mobile device, store the templates in the database 216, and allow the mobile device 208, customer, software developer, or other entity to create, view, update, delete, and otherwise manage their templates.

The template service 206 may grant the mobile device 208 the ability to define a task definition. The template service 206 may allow customers or software developers with the ability to provide the task definition by uploading a task definition file or may provide the task definition by allowing customers to select from various options and/or change default settings to dynamically create a task definition file. The template service 206 may allow customers to register a task definition with one or more clusters or one or more of the container instances 218. The template service 206 may also provide an editing interface for editing currently registered task definitions. The template service 206 may register the task definitions in the database 216.

In some examples, a "fleet" may refer to a set of computer systems (virtual or physical) running instances, such as the container instances 218 of the present disclosure or other applications of the container service 200. A fleet may be subdivided into sub-fleets, and each sub-fleet may be supported by a container manager backend service and an agent communication service dedicated to that sub-fleet. The agent communication services 220 may be configured to communicate with the container agents 222 and telemetry agents 224 running on container instances within the sub-fleet. The container manager backend services 214 may be configured to provide other management services to the sub-fleet on the backend, such as the cluster manager described in the present disclosure. The agent communication services 220 and container manager backends 214 may be implemented on separate computer systems within the sub-fleet, separate virtual machine instances within the sub-fleet, may share the same computer systems and/or virtual machine instances within the sub-fleet, or may run on computer systems separate from but in communication with their respective sub-fleet. There may be multiple container instances 218 per sub-fleet. In some cases, each sub-fleet may represent a single cluster. In other cases, clusters may span multiple sub-fleets. In still other cases, each sub-fleet may host more than one cluster. The router service 210 may be configured to route requests from the front end service 204 to the appropriate sub-fleet. In some embodiments, the router service 210 may route requests to a single sub-fleet. In other embodiments, the router service may route requests between multiple sub-fleets.

The telemetry service 212 may be configured to aggregate control group metrics (e.g., information about the processes running within the containers) and container logs and provide the aggregated metrics and logs to a resource monitor to allow the customers 202 to monitor resource utilization, such as processor, storage, and network usage, of their respective container instances. Control group metrics include information, such as the amount of memory used by processes of the containers, number of times that a process triggered a page fault, central processing unit usage by the processes of the containers, time during which the central processing units were executing system calls on behalf of processes of the containers, number of reads and writes by the processes of the containers, and number of input/output operations queued for the processes of the containers.

The container manager backend services 214 may be configured to receive placement requests from the mobile device 208 for their software functions, and may ensure that the requested resources are available for the containers. The container manager backend services 214 may then write the desired container state to the database 216. Additionally, the container manager backend services may receive information from individual container agents regularly, such as information related to life-cycle events and heartbeats (e.g., periodic signals sent by a container agent to indicate normal operation).

The database 216 may be a data store located within the distributed computing system of the container service 200, or may be a data store of a different service of a computing resource service provider, such as a relational database service. In some embodiments, the database 216 may be a set of distributed databases that share a transaction log. The agent communication service 220 may be configured to track the status of all agents in a cluster, and may push run commands and state transitions to its respective instance. In some embodiments, communication by other components of the container service, such as the cluster manager, with containers and the container instances 218 is performed through the agent communication service 220. Each fleet may have at least one agent communication service, which relays the messages between the container agents 222 of the fleet.

The container agents 222 may be software applications configured to run in instances owned by the mobile device 208 and may act as interfaces between their respective container instances 218 and other services and entities, such as the container manager backend services 214. For example, the container agents 222 may act as intermediaries between the running tasks of their respective container instances 218 and other entities and services such that all communication to or from a container instance 218 passes through the container agent 222. In this manner, the container agent 222 may be configured to interpret and translate commands between the container instance and a particular container encapsulation system running with the container service 200. This may allow changes to be made to the particular container encapsulation system without requiring updates to be made to the tasks or task definitions; i.e., only the container agents 222 may need to be updated to reflect the changes to the particular encapsulation system.

Thus, each of the container instances 218 may have a respective container agent 222 running within it that communicates with a respective container manager backend service. The container agent 222 may, itself, be a software function configured to monitor its respective container instances 218 and may provide information to the system usable to launch container instances, track container instances, and monitor cluster state. The container agent 222 may also perform functions of registering and deregistering its respective container instance 218, starting and stopping tasks within its respective container instance 218. The container agent 222 may also be configured to respond to requests to describe its respective container instance 218, requests to list tasks running on it is respective container instance 218, and requests to describe tasks running in its respective container instance 218.

The container agents 222 may be configured to monitor the health of the software functions within the respective container instances 218 (e.g., report heartbeats signaling that the container instance is operating, report lifespans of containers, and report container statuses and occurrences of container errors), and may further be configured to perform actions based on the occurrence of certain events. For example, if a container agent 222 detects that a container has encountered and error and ceased operation, the container agent 222 may automatically cause a new container instance to be generated to replace the malfunctioning container instance. In other embodiments, the scheduler 202 may take certain actions in response to events reported to it by the container agents 222. In the above example, it may be the scheduler 202 that causes a new container to be generated to replace a malfunctioning container. The mobile device 208 may specify conditions, events, and actions for the scheduler 202 and/or container agent 222. For example, the customer may specify if the mobile device's 208 software functions cease operations, such as due to an error or power outage, that the scheduler 202 or container agent 222 is not to generate replacement containers for the inoperative software functions. Instead the mobile device 208 may specify that the scheduler 202 or container agent 222 is to notify (e.g., by changing a status indicator, providing an e-mail message, etc.) the mobile device 208 of the occurrence of the problem instead.

The container agents 222 and/or the telemetry agents 224 may be configured to launch automatically when their respective container instances 218 are instantiated. If a new container encapsulation system is implemented by the container service 200, the only changes required for the container instances 218 and software functions may be for new container agents configured to be compatible with the new container encapsulation system to be created and the container agents 222 to be swapped for the new container agents. In such a case, the mobile device 208 should be able to use the same application programming interfaces with the container service 200, and the new container agents should be configured to support the same application programming interfaces without the mobile device 208 being aware of the change to the new encapsulation system.

The container agents 222 may be polled by the container encapsulation system to communicate information to the container encapsulation system. The container agent 222 may register or deregister container instances 218, receive instructions from the container manager backend services 214, and ensure that a telemetry agent 224 has been started and is running. The container agent 222 may also enable updates to containers in the container instances 218 and monitor the state of containers running in the container instances 218 via an event stream.

The telemetry agent 224 may be configured to collect telemetry data, such as a set of control group metrics and container encapsulation system logs, and provide such telemetry data to the telemetry service 212. The telemetry service 212 may be configured to react to data received from the telemetry agent 224, such as by triggering an alarm or taking some other action. For example, if the telemetry agent 224 communicates a log indicating an error state of a software function or container instance to the telemetry service 212, the telemetry service 212 may react by triggering an alarm that the software function or container instance has experienced an error. As another example, the telemetry service 212 may trigger an alarm if one of the metrics (e.g., central processing unit usage by processes of a container) exceeds a threshold. Examples of triggering an alarm include providing a text message to the mobile device 208 owner of the container, e-mailing the customer owner of the container, and/or displaying a visual indicator (e.g., a red icon, popup window, etc.) on an interface displaying container statuses. The front end service 204 may receive application programming interface calls from mobile device 208 that specify the conditions necessary for the telemetry service 212 to take action and specify what actions the telemetry service 212 should take.

The container service 200 may also allow data volumes to be linked to software functions. Such data volumes may be designated directories within a software function, and may be shared with one or more other software functions, that may bypass the default file system of the container instance. In this manner, data may be stored persistently and shared among other software functions within the container instance 218. The data volume may be configured through entries in the task definition file. In some implementations, creation and selection of one or more data volumes for a software function may be achieved through a user interface configured for that purpose that communicates to the front end service 204. The container service 200 may utilize other data storage services, such as the on-demand data storage service or the block-level data storage service, of the computing resource service provider for providing the storage for the data volume. In other implementations, the data volumes may utilize the native storage of the container instance for the data volume.

The container service 200 may be integrated with other services of a computing resource service provider. For example, the container instances may be tagged and/or assigned to an auto-scaling group of an auto-scaling service of the computing resource service provider. In this manner, the auto-scaling service may monitor resource usage by the container instances and may dynamically adjust/allocate resources as needed, such as a sudden increase in resource demand by the container instances. Likewise, the container service 200 may integrate with a load-balancer service of the computing resource service provider. For example, the load-balancer service may distribute traffic to the containers or container instances in order to balance the workload between the container instances.

As an example, the mobile device 208 may operate a website using container instances 218 assigned to an auto-scaling group. The website may receive requests from multiple users over the Internet, and a load balancer of the load-balancer service may distribute the requests to the container instances 218 according to a load-balancing distribution scheme. The load-balancer service may be a computer system or virtual computer system configured to distribute the requests to the container instances 218 assigned to the load balancer in order to optimize resource utilization and/or avoid overloading any particular host computer. For example, the load balancer may include physical hardware connected to a server rack or otherwise included in a data center. In another example, the load balancer may include one or more virtual machines supported by a host computer. At the same time, the auto-scaling service may detect whether more or fewer resources are needed by the container instances 218 due to the incoming requests, and may allocate more or fewer resources to the container instances 218 as needed.

Figure 3:
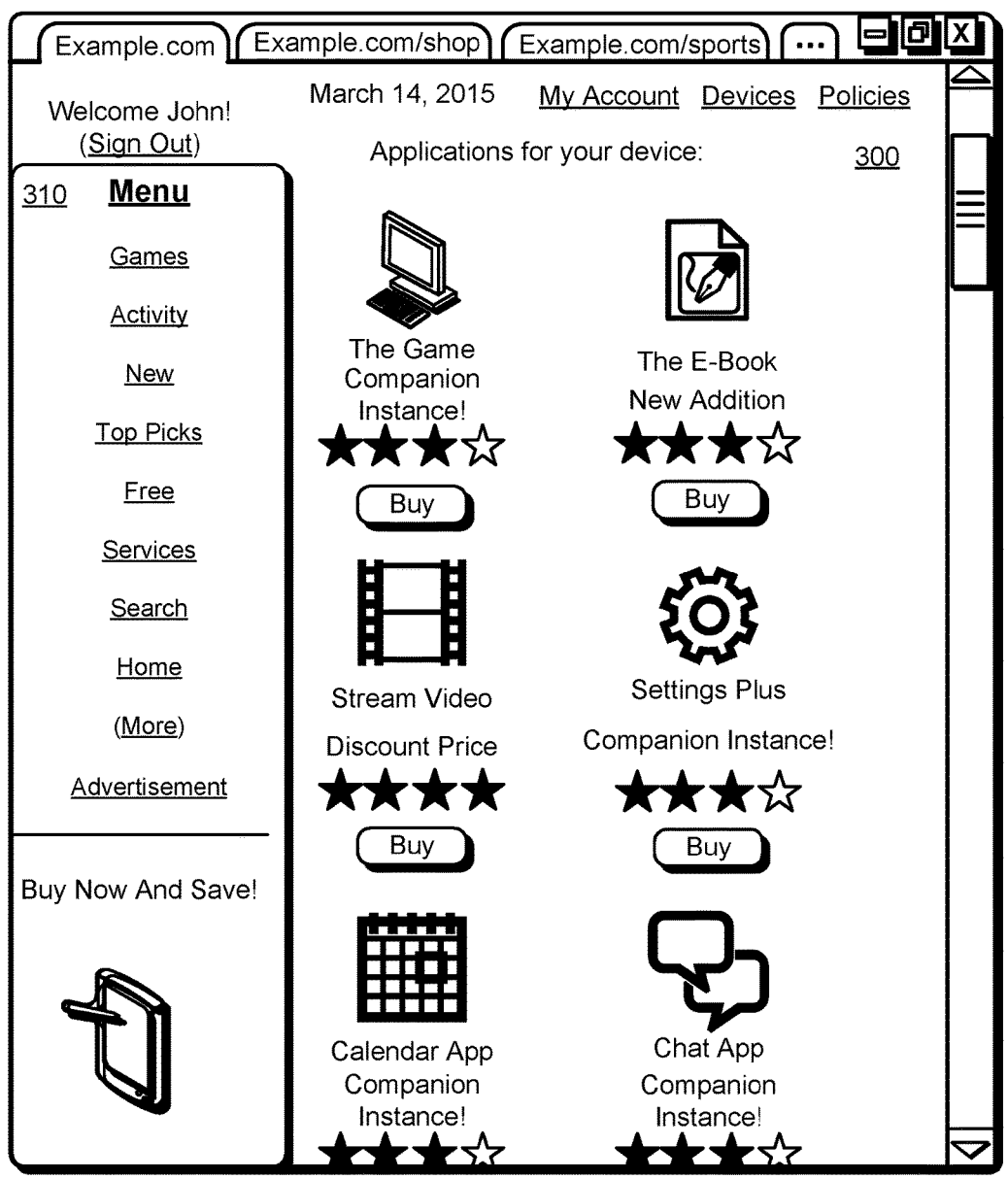
FIG. 3 is an illustrative example of a webpage for consuming container-backed applications in accordance with at least one embodiment.

FIG. 3 shows a webpage 300, which may be displayed by an application executed by a mobile device enabling a customer to purchase or otherwise obtain one or more applications supported by a companion container instance. As illustrated in FIG. 3, the webpage 300 includes various graphical user interface elements that enable navigation throughout a mobile application store of which the webpage 300 is a part. In various embodiments, the webpage 300 is implemented by a service provider and the service provider is responsible for receiving customer input into the webpage 300 and transmitting the received input to various other services of the service provider configured to instantiate a companion container instance associated with the application or otherwise possess the customer's input. For example, as described in greater detail below, the customer's input may cause the service provider to enable the customer's mobile device and an associated companion container instance to access an application in order to install the application on the mobile device and the companion container instance. The webpage 300 may be displayed by various applications, such as a mobile application or web browser. In this example, the webpage 300 includes various navigational features. For instance, on the left-hand side of the webpage 300, various links 310 may link to one or more other webpages that contain additional content corresponding to the application store. In this example, the links appear as textual words, which enable the links to be selected using an appropriate input device such as a keyboard, mouse, touchscreen or other input device. Selection of one of the links 310 may cause an application displaying the webpage 300 to submit, pursuant to a uniform resource locator (URL) associated with the selected link by the programming of the webpage 300, an HTTP request for the content associated with the link to a server that provided the webpage 300 or another server. In this example, the webpage 300 also includes a graphical user element configured as a "buy" button. The buy button may be a graphical user interface element of the webpage 300 where the underlying code of the webpage 300 is configured such that selection by an input device of the buy button causes information corresponding to the selection to be transmitted to one or more servers of the service provider.

The webpage 300 may also include a description of the applications and/or other information associated with the applications displayed in webpage 300. The description may provide information to the customer including whether the application is associated with a companion container instance. In some embodiments, the mobile device may be provided with a companion container instance when an application or particular application is consumed from the application store. For example, a companion container instance may be instantiated and associated with the customer mobile device once the customer has downloaded and/or installed an application of the customer's mobile device that is supported by a companion container instance. In this example, the webpage 300 contains six applications that the customer may download and/or provide to the customer's mobile device. The applications may be provided by a developer, by the service provider, or any other party capable of posting application to the webpage 300. The executable code of the application may indicate whether the application utilizes a companion container instance.

Furthermore, the applications displayed in the webpage 300 may correspond to services offered by the service provider or one or more other organizations. For example, the services may include a messaging, delivery service, or other service. The applications displayed on the webpage 300 may contain a presentation of the application such as a graphical representation of the service or operation associated with the application, which could be text and/or a drawing, photograph, description, identification number, trademark, video clip, audio clip, or any other representation capable of representing the items. Other variations of the user interface displayed in FIG. 3 may be used in accordance with the present disclosure. For example, drop-down menus may be included in the user interface to enable the user to select a particular user account or information associated with a customer account to include when provisioning new mobile devices.

Figure 4:
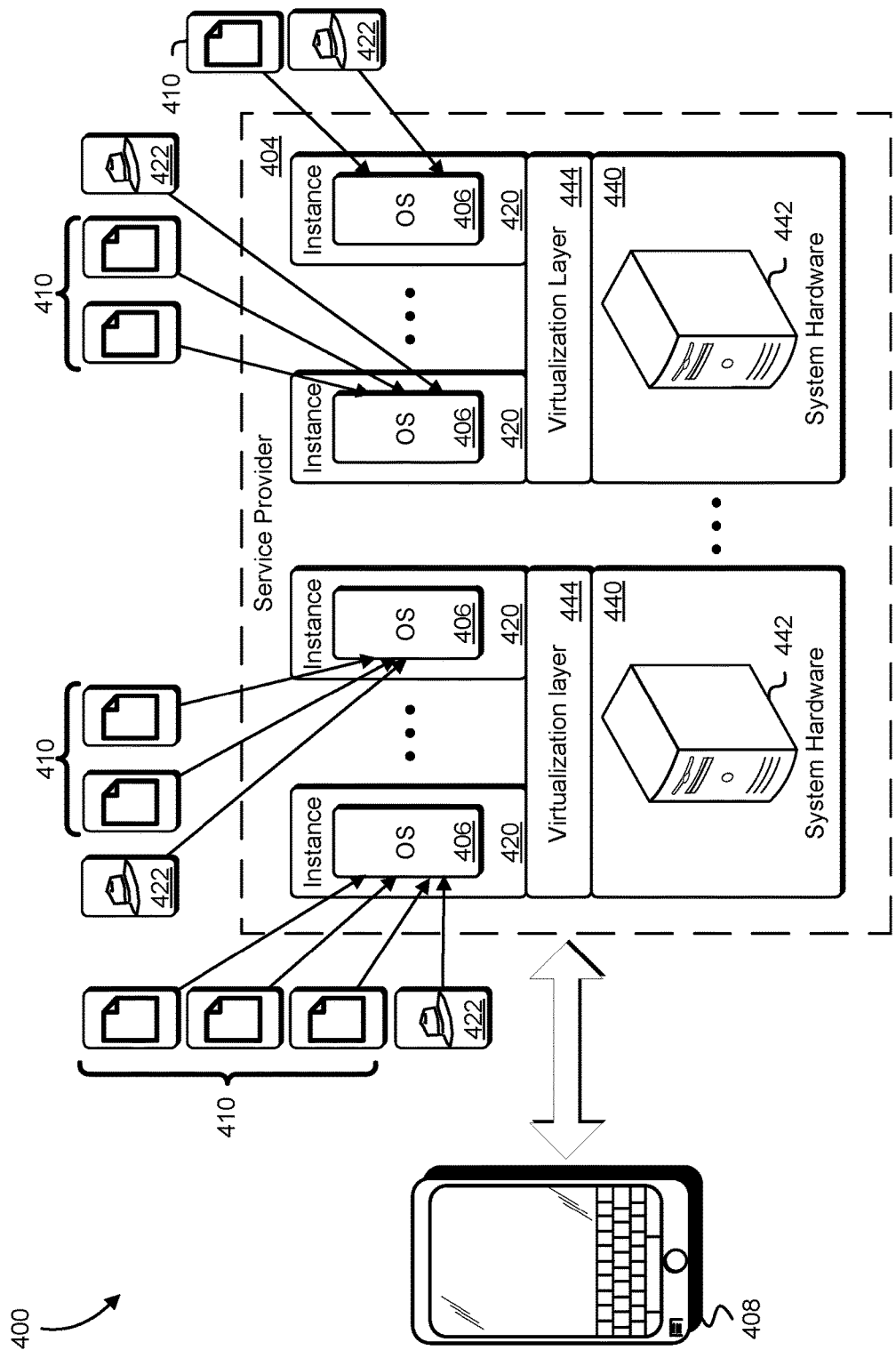
FIG. 4 illustrates an example of virtualization of the container service in accordance with an embodiment.

FIG. 4 illustrates an aspect of an environment 400 in which an embodiment may be practiced. Specifically, FIG. 4 depicts a container service, as described above in connection with FIG. 2, executing a plurality of virtual machines configured as container instances 420 in accordance with at least one embodiment. The container service may provide system hardware 440 to mobile device 408 of a computing resource service provider 404 providing the container service to perform computation services within containers 410. The system hardware 440 may include one or more hosts 442, also referred to as host computer systems. Each of the hosts 442 may be any device or equipment configured to execute instructions for performing data computation, manipulation, or storage tasks, such as a computer or a server. The hosts 442 may be equipped with any needed processing capability including one or more processors, such as a central processing unit, a graphics processing unit, or a digital signal processor. The hosts 442 may also be equipped with memory (e.g., static and dynamic memory), buses, and input and output ports that are compliant with any handshaking, communications or data transfer protocol. The system hardware 440 may also include storage devices, such as storage disks and tapes, and networking equipment. The storage devices may be network storage devices managed by a data storage service, such as a block-level data storage service.

Virtualization layers 444 in the system hardware 440 enable the system hardware 440 to be used to provide computational resources upon which one or more container instances 420 may operate and use to execute software functions and other tasks. The virtualization layer 444 may be any device, software, or firmware used for providing a virtual computing platform for the container instances 420. The virtualization layers 444 executing on the hosts 442 enable the set of system hardware 440 to be used to provide computational resources necessary to support the container instances 420. Furthermore, the physical host 442 may host multiple virtualization layers of the same or different types on the same system hardware 440. Each container instance 420 may include various virtual computer components, such as one or more virtual processors, virtual memory, and virtual storage. The container instances 420 may be provided to the mobile device 408 operated by customers of the computing resource service provider 404 and the container instances 420 may run an operating system 406 and applications (e.g., software functions 410) on each of the container instances 420. An example of a virtualization layer 444 includes a hypervisor.

Requests may be received by a request interface, such as the front end service 204 of FIG. 2 operated by the computing resource service provider 404. The request interface may direct the request to the appropriate container instance 420. Each container instance 420 may include one or more software agents 422. The software agents 422 may be configured to allow the mobile device 408 to manage and interact with their respective software functions 410 and container instances 420. The software agents 408 may be further configured to perform logging of events and gather telemetry data related to the software functions 410 and container instances 420. Examples of such software agents 422 are the container agents 222 and the telemetry agents 224 described in conjunction with FIG. 2.

The operating systems 406 may be any operating systems suitable for running within the container instances 420 and that provide isolation technology that enable containerization schemes to isolate virtualization instances, such as the software functions 410, from other processes running under the operating system 406. Examples of such operating systems include various implementations of Linux operating systems that support resource isolation features in the Linux kernel. As noted, the software functions 410 may be virtualized instances within the operating systems 406 launched from application images in accordance with one or more task definitions, and may be allocated resources from their respective container instances 420.

Figure 5:
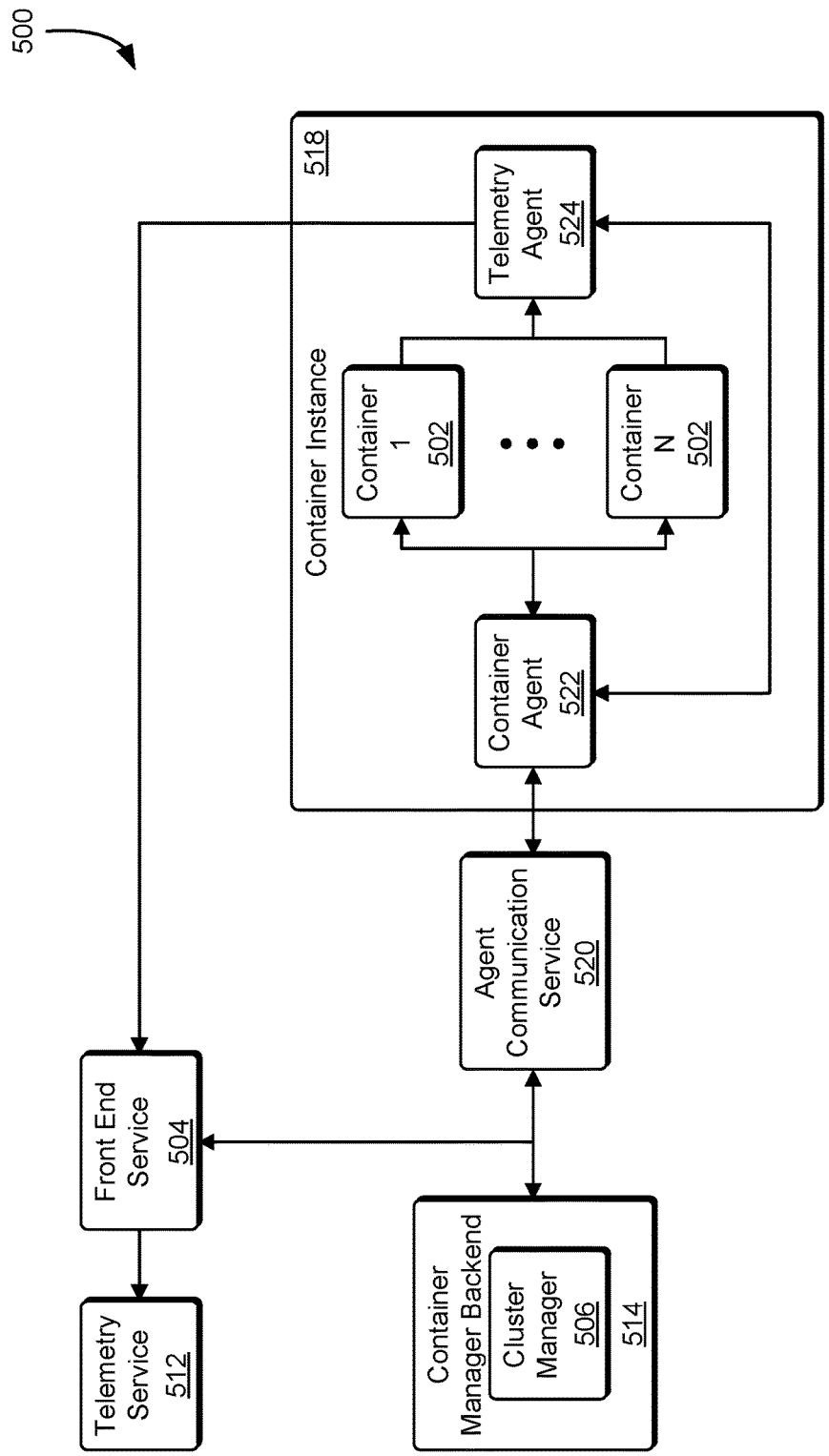
FIG. 5 illustrates an example of a container instance in accordance with an embodiment.

FIG. 5 illustrates an aspect of an environment 500 in which an embodiment may be practiced. As illustrated in FIG. 5, the environment 500 may include a set of software functions 502 launched within a container instance 518 being monitored by a container agent 522 and providing metrics and log information to a telemetry agent 524. The container agent 522, in turn, communicates with the front end service 504, similar to the front end service 204, and a cluster manager 506 running in a container manager backend 514. The telemetry agent 524 communicates the metrics and log information to a telemetry service 512, as described above in connection with FIG. 2.

The software functions 502, similar to software functions discussed elsewhere in the present disclosure, may be running in virtualization instance environments (also referred to as tasks) of varying lifespans (e.g., short-term batch jobs, long-term background processes, etc.) that have been isolated from other processes within the container instance. Metrics about the software functions 502 may be gathered by the telemetry agent 524, aggregated, and provided to the telemetry service 512. The container agent 522 acts as a go-between between the software functions 502 and resources, services, and other entities outside the namespace of the software functions 502. In some implementations, the software functions 502 may be configured to share external resources, such as block-level data storage volumes. In some of these implementations, access to and communication with the shared external resources by the software functions 502 may be made through the container agent 522. In other implementations, the container instance 518 or operating system of the container instance 518 may support allowing the software functions 502 to access or communicate with the shared resources without going through the container agent 522.

The cluster manager 506 may be may be a computer system or component of a computer system that is configured to apply a set of rules to determine within which container instance 518 that software functions 502 should be launched. For example, when the container instance 518 is instantiated, its container agent 522 may notify the cluster manager 506 that the container instance 518 is available for hosting software functions for a customer. Thereafter, if a customer request to launch a container is received through the front end service 504 from the customer, the cluster manager 506 may select the container instance 518 and tell the container agent 522 of the container instance 518 to launch the container. The cluster manager 506 may also be configured to determine what actions should be taken in response to certain types of container events. For example, if one of the software functions 502 malfunctions and/or ceases operation, the cluster manager 506 may determine to re-launch the malfunctioning or inoperative software function 502. The cluster manager 506 may be multitenant; e.g., the cluster manager 506 may manage clusters for multiple mobile devices of the computing resource service provider and may be configured to launch software functions for the customers within resources owned by those customer.

As noted, the container manager backend 514 may be configured to provide an environment for other processes supporting the software functions and container instances in the particular sub-fleet, such as the cluster manager 506. The container agent 522 may be configured to provide lifecycle and health information about the software functions 502 being monitored by the container agent 522 to the cluster manager 506. In some implementations, the container agent 522 collects metrics and log information and passes this information to the telemetry agent 524 or directly to a telemetry service. As well, in some implementations, the container agent 522 may communicate to the cluster manager 506 through the agent communication service 520. In other implementations, the container agent 522 may communicate directly with the cluster manager 506. Note that the container agent 522 may be a software function that is launched when the container instance is created, and in other cases the container agent 522 may be a process running under the operating system of the container instance in communication with the software functions 502.

As noted, the telemetry agent 524 may gather metrics and log information about the software functions 502 running within the container instance 518 and pass the gathered metrics and log information to the telemetry service 512. In some implementations, the telemetry agent 524 may be a separate container of its own that launches when the container instance 518 is created. In other implementations, the telemetry agent may be a process running under the operating system of the container instance 518 and configured to receive metrics and log information directly through the software functions 502 or through the container agent 522. Note that not all implementations of the present disclosure require a telemetry agent 524 and/or telemetry service 512.

Figure 6:
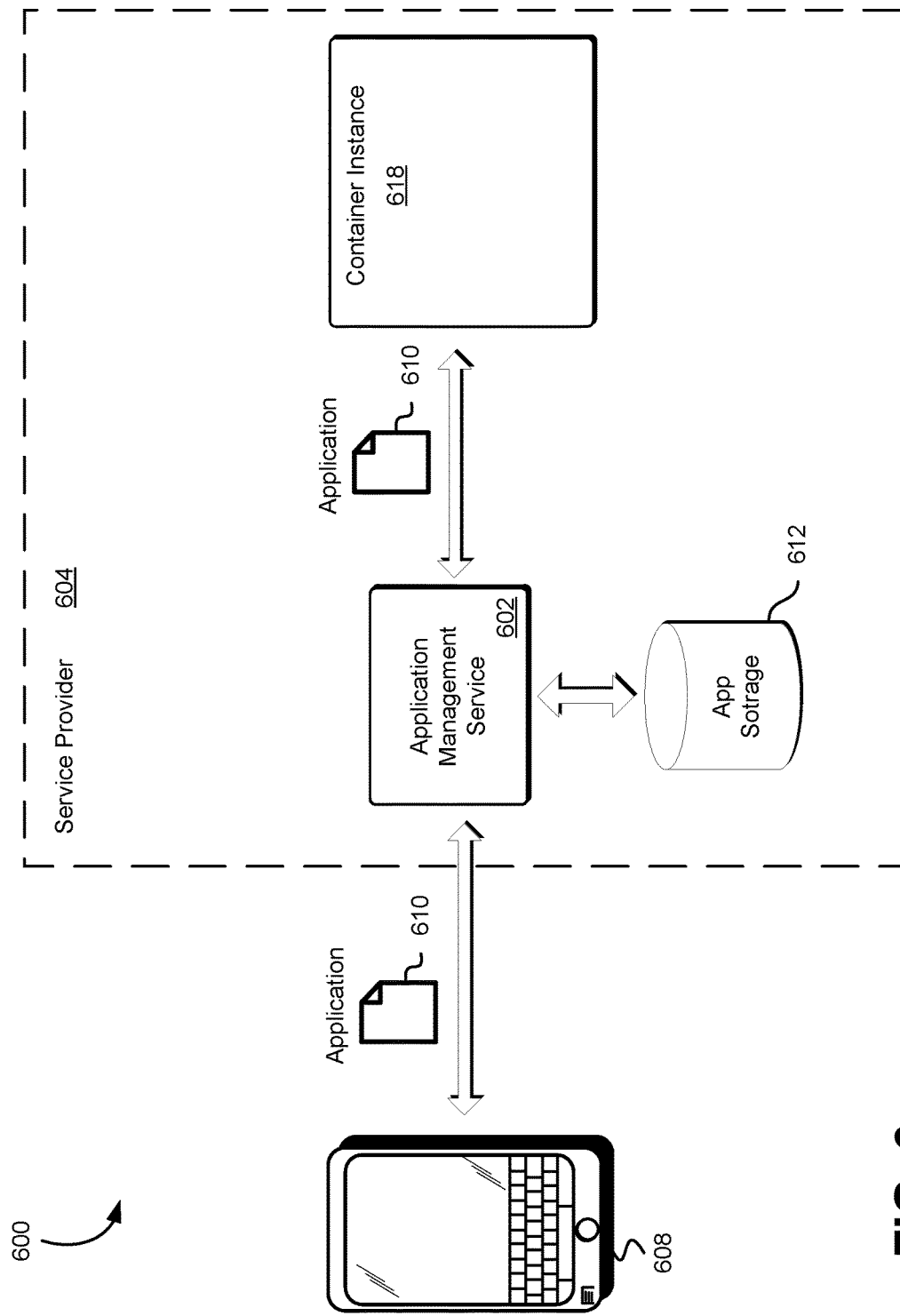
FIG. 6 is a diagram illustrating an environment for distributing applications to container-backed mobile devices in accordance with at least one embodiment.

FIG. 6 illustrates an example environment 600 where a mobile device 608 and companion container instance 620 may obtain access to an application 610 in order to execute the application. A service provider 604 may provide system hardware in order to execute the companion container instance 620 as well as task data storage 612 in order to provide the tasks 610 to the mobile device 608 and the companion container instance 620. In some embodiments, the application may be divided into components, each component executable by the mobile device 608 or the companion container instance 620. As described above, developers may tag components of the application as executed by the mobile device 608 or the companion container instance 620. When obtaining the task, task definition, or software function from the task data storage 612, the mobile device 608 and the companion container instance 620 may obtain only the component of the task executable by the respective computer system. The task data storage 612 may comprise one or more computing resources that collectively operate to store data for a task, task definition, or software function using block-level storage devices or storage devices and/or virtualizations thereof.

The service provider may also operate an application management service 602 configured to manage access to tasks, task definitions, or software functions and provide updates to tasks, task definitions, or software functions. The application management service 602 may be a collection of computing resources, such as a set of virtual machines executing a webserver, configured to provide the mobile device 608 and the companion container instance 620 with application based at least in part on customer input. In some embodiments, the application management service 602 contains an interface accessible by the customer through the mobile device 608 or another device, such as a laptop. The interface may be configured, as described above in connection with FIG. 3, such that the customer may consume the applications, and as a result the applications may be obtained by the mobile device 608 and/or the companion container instance 620 from the task data store 612. In some embodiments, the application management service 602 may first cause the application to be loaded into memory of the companion container instance 620 and then the mobile device 608. Furthermore, the companion container instance 620 may receive an indication of a second application consumed and/or loaded into memory of the mobile device 608 and, as a result, may obtain a component of the application from the task data store 612.

For example, the customer may consume a particular task, task definition, or software function using the webpage described above, consumption of the particular task, task definition, or software function by the customer, who may cause the application management service 602 to provide a URL to the mobile device 608, which, when followed by the mobile device 608, enables the mobile device 608 to obtain the portion of the task, task definition, or software function executable by the mobile device 608. Similarly, the application management service 602 can provide another URL to the companion container instance 620, which, when followed by the companion container instance 620, enables the companion container instance 620 to obtain the portion of the task, task definition, or software function executable by the companion container instance 620. In some embodiments, the same URL is provided to both the mobile device 608 and the companion container instance 620. In still other embodiments, the application management service 602 may provide the task, task definition, or software function directly to the mobile device 608 and companion container instance 620.

The application management service 602 may, in some embodiments, operate the webpage described above in connection with FIG. 3. Furthermore, the application management service 602 may cause a companion container instance 620 to be generated and/or instantiated. For example, the customer may purchase an application, including a task, task definition, or software function, through the webpage described above or through an application, and as a result, the application management service 602 may transmit a request to one or more other services of the service provider 604, such as a container management service described in greater detail above, to instantiate a companion container instance 620 associated with the customer and/or the customer's mobile device 608. The container management service may then return an IP address or other information suitable for locating the companion container instance 620 in response to the request. The application management service 602 may then provide the task 610 to the companion container instance 620 based at least in part on the information provided by the container management service.

Figure 7:
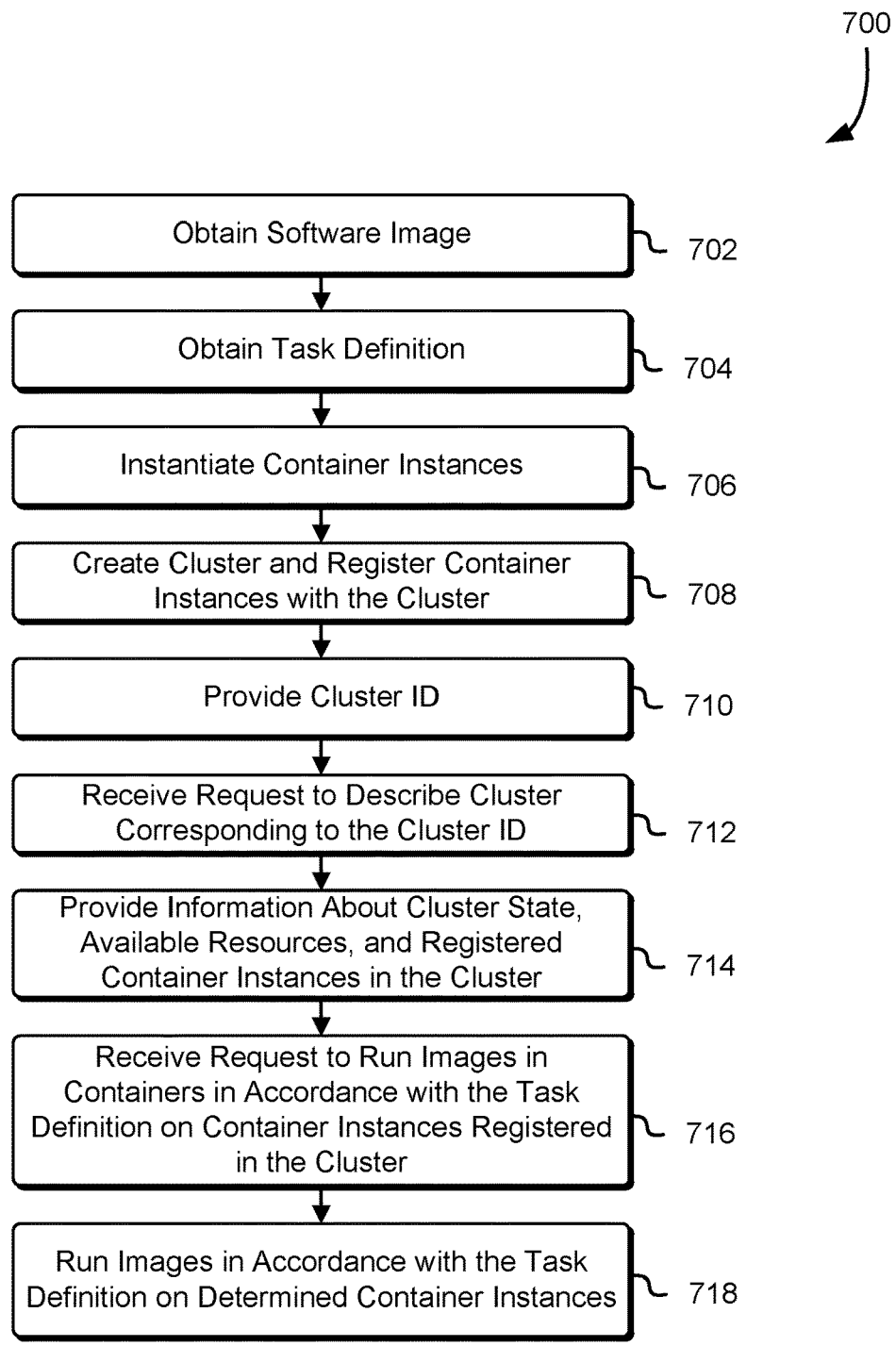
FIG. 7 is a block diagram that illustrates an example workflow for launching a task on a cluster in accordance with an embodiment.

FIG. 7 is a block diagram illustrating an example of a process 700 for launching tasks into a cluster in accordance with various embodiments. The process 700 may be performed by any suitable system, such as a server in a data center, multiple computing devices in a distributed system of a computing resource service provider, or any electronic client device such as the mobile device described below in connection with FIG. 17. The process 700 includes a series of operations wherein a software image and a task definition for a software function is obtained, a cluster is created and container instances are registered to the cluster, the cluster is described, the image is launched within determined container instance in accordance with the task definition, and the cluster is description is updated.

In 702, a computing resource service provider receives a software image from mobile device, software developer, service of the computing resource service provider, or a customer of the computing resource service provider. As noted, a software image may refer to data representing the entire state of a software application at the time it was imaged, such that the software application may be restored to this point by restoring/launching the software image. In some cases, the operations in 702 may be to obtain an executable installation or application file rather than an image. Note, in some cases, receiving the software image includes having a software image accessible to the computing resource service provider, such as through a resource location specified in a task definition file. In some cases, the software image may be stored in a data store, such as the database 216 of FIG. 2 of the computing resource service provider. In numerous variations of the process 700, the computing resource service provider may obtain the software image as a result of a request from a mobile device to execute an operation or function as described above.

In 704, the computing resource service provider may receive a task definition describing the tasks/containers to run within one or more container instances. The task definition may be in the form of a task definition file or may be generated by the computing resource service provider in response to options selected by the customer through a user interface. The task definition may specify information, such as a description of the tasks/containers, locations of where to find images for the tasks/containers, amounts of resources allocated to the tasks/containers, shared resources, relationships between other containers, and other information. As noted, the task definition may be stored in a data store, such as the database 216 of FIG. 2 of the computing resource service provider.

In 706, the container instances may be instantiated. As has been noted, container instance may be virtual machine instances that support containerization. In some cases, instantiating the container instances includes launching a container agent within the container instance. The container agent may run under an operating system of the container instance, and the container agent may itself be a container.

In 708, one or more clusters may be created. As has been noted, a cluster may be a logical grouping of one or more container instances. Clusters may be used for various purposes, including separating tasks by function, grouping different types of container instances together, and grouping container instances based on locations of the physical host machines within the computing resource service provider infrastructure. Once a cluster is created, one or more container instances may be registered as being members of the cluster. As has been noted, in some cases, container instances may be members of more than one cluster. Note that operations 706-08 may occur together or in any order. For example, a cluster may be created before container instances, and, as the container instances are instantiated, the container agents within the container instances may automatically register the container instances with the cluster.

In 710, the computing resource service provider provides a cluster or cluster ID to the customer or other entity that may be responsible for requesting tasks to be launched. In some cases, this other entity may be a scheduler, such as the scheduler 208 of FIG. 2 provided by the container service or a scheduler installed by the customer. The cluster ID may be provided in response to a request to create the cluster in 708. At other times, the cluster ID may be provided to a requesting entity that made a ListClusters application programming interface call.

In 712, a DescribeCluster application programming interface call may be received from a customer or other entity responsible for requesting tasks to be launched (e.g., a scheduler), specifying a cluster (e.g., by passing the cluster ID of 710 as a parameter) to describe. In response to the DescribeCluster application programming interface call, the computing resource service provider in 714 may provide information about the cluster, including the number and IDs of container instances within the cluster, resources available within the cluster, resources being used in the cluster, running tasks, etc. This information may be used by the customer or scheduler to determine where (e.g., which container instance) particular tasks should be launched (e.g., to achieve certain performance goals, to balance load, etc.).

In 716, the computing resource service provider receives a request to run one or more tasks in accordance with information specified in the task definition obtained in 704. In some cases, the request may specify which container instances in which to run the one or more tasks. In other cases, the request may specify which cluster in which to run the one or more tasks, and a scheduler, such as the scheduler 216 of FIG. 2, may determine into which container instance the tasks should be launched according to a placement scheme. Placement schemes may include round robin placement schemes, stochastically-assigned placement, or heuristics based on resource usage or other criteria.

Once the target location of the tasks are determined (e.g., after determining instance IDs of container instance in which to launch the tasks) in 718, the tasks corresponding to software images of 702 may be launched into one or more container instances in accordance with the task definition of 704. In some cases, the launching of the tasks may be performed by the container agents running in the determined container instances.

Figure 8:
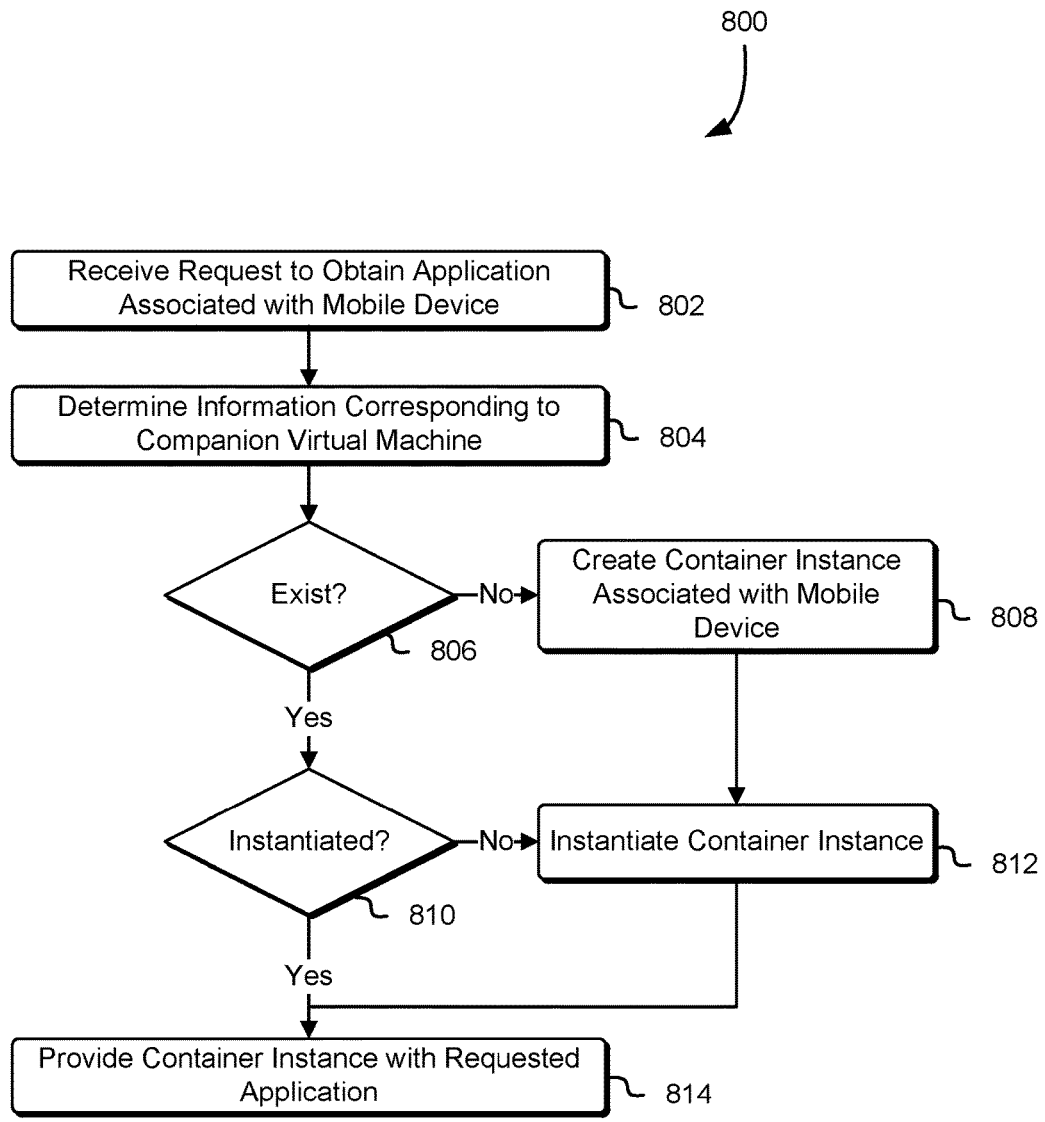
FIG. 8 is an illustrative example of a process for providing a container-backed mobile device in accordance with at least one embodiment.

FIG. 8 shows an illustrative example of the process 800, which may be used to execute a software function on behalf of a mobile device by a container instance. The process 800 may be performed by any suitable system, such as the container service described above in connection with FIG. 2. Returning to FIG. 8, in an embodiment, the process 800 includes receiving a request associated with a mobile device 802. The request may be generated by the mobile device as a result of receiving an input from a customer, such as interacting with an application executed by the mobile device. In some embodiments, the request may be transmitted by a registration service or other service responsible for managing software functions associated with the mobile device. For example, the registration service may determine a set of applications installed on the mobile device that may be supported by a companion container instance and a set of software functions and transmit a request to obtain the set of software functions on behalf of the companion container instance.

The computer system executing process 800 may then determine information corresponding to the companion container instance and the set of software functions to be executed by the companion container instance 804. For example, the application management service may transmit a request to the container service to determine the status of the companion container instance and resources available to the companion instance as described above. In various embodiments, process 800 is executed by the container service and the container service queries a database for the information corresponding to the companion container instance. The information corresponding to the companion container instance may include whether the companion container instance for the mobile device exists 806. If the companion container instance for the mobile device does not exist, the computer system executing process 800 may cause the companion container instance to be associated with the mobile device 808. In numerous variations of the process 800, the container service may simply determine that a container instance is available to process the request submitted by the mobile device, for example, by executing a software function on behalf of the mobile device. In some embodiments, creating the companion container instance may include transmitting a request to the container service to create a container instance associated with the mobile device. The request may include various parameters of the companion instance such as size, computing power, operating system, networking interface, virtual machine image, or any other information suitable for generating a container instance as described above.

Returning to process 800, if the companion container instance exists, the computer system executing process 800 may then determine if the companion container instance or other container instance is currently available 810. If no container instance is instantiated, the computer system executing process 800 may then cause the companion container instance to be instantiated 812. In some embodiments, the service provider or container service may be configured to terminate or otherwise un-instantiate the companion container instance when not used by the mobile device. The companion container instance may therefore be instantiated in order to execute the software function indicated in the request. Once the companion container instance has been instantiated, the process 800 may continue and the computer system executing process 800 may cause the container instance to execute the software function 814. For example, the software function may perform an operation or function on behalf of the mobile device as described above.

Figure 9:
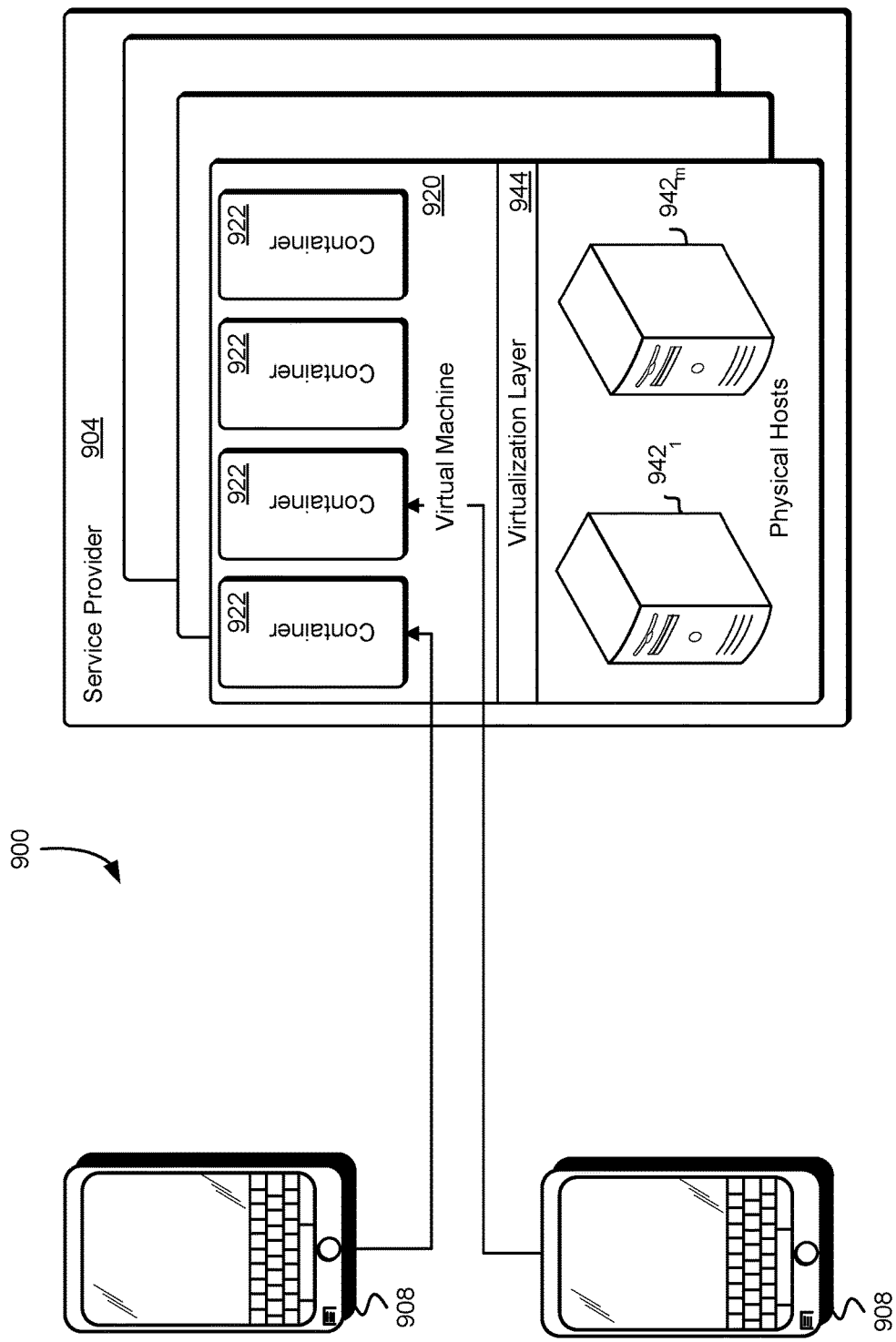
FIG. 9 is a diagram illustrating an environment for communicating with a container from a mobile device in accordance with at least one embodiment.

FIG. 9 shows an example 900 of customers sending requests to a service provider 904 to interact with a companion container instance 920. The computing resource service provider 904 may provide a companion container instance 920 in order to support the operation of a mobile device 908. The customer may send requests 918 to the service provider 904 over a network, such as the Internet, and the request may be generated by the mobile devices 908. The request 918 may be appropriately configured API calls generated by the mobile device 908 or application thereof, such as an agent application described in greater detail below. In various embodiments, the requests 918 are received by a request interface 914 operated by the service provider 904. The request interface 914 may direct the request to the appropriate system, such as the virtual machine management service 902 shown in FIG. 9. As requests 918 are received by the request interface 914, information corresponding to the requests may be used to route the request 918 to the appropriate service and/or system. In some embodiments, the request interface 914 may query the virtual machine management service 902 to determine a location of the companion container instance 920 included in the request 918 and transmit the request 918 directly to the indicated companion container instance 920. In various embodiments, the virtual machine management service 902 may manage the operation of one or more companion container instances 920. While FIG. 9 shows one request interface 914 for the service provider 904, each service of the service provider 904 may operate an interface and, generally, subsets of the services may have corresponding interfaces in addition to or as an alternative to the request interface 914.

Returning to FIG. 9, the companion container instance may execute in an isolated environment 912, as described above, or may otherwise be segregated such that communication between the companion container instance 920 and other systems of the service provider is limited. Additionally, the companion container instance 920 may include a storage device 910. The storage device may be on-demand data storage, block-level storage, or any other suitable data store or virtualization thereof. The storage device 910 may be utilized to store information on behalf of the mobile device 908. For example, the companion container instance 920 may be configured to back up data generated by the mobile device 908 or data generated by the companion container instance 920 on behalf of the mobile device 908.

Figure 10:
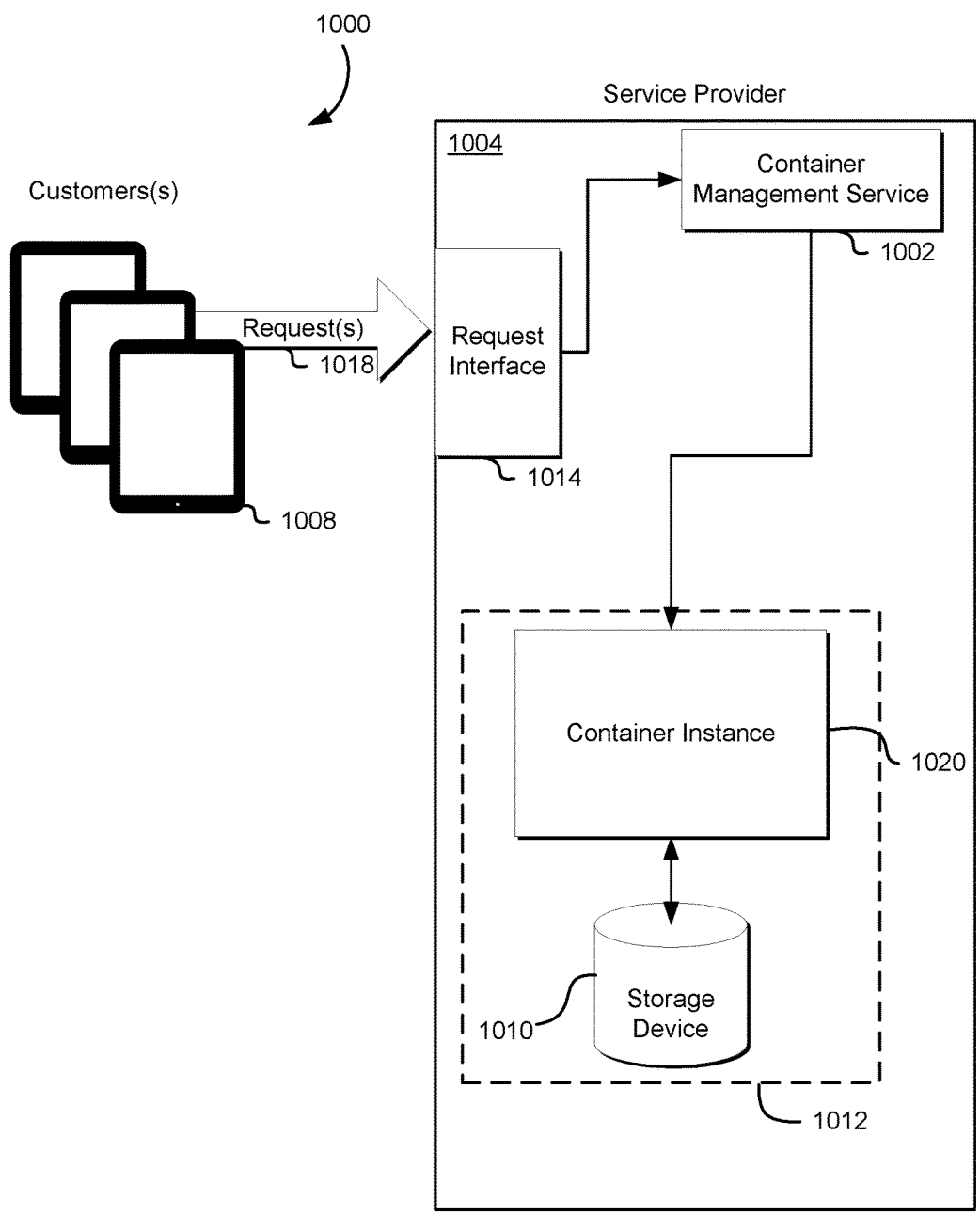
FIG. 10 is a diagram illustrating an environment for processing data by a container-backed mobile device in accordance with at least one embodiment.

FIG. 10 illustrates an environment 1000 in which a service provider 1004 may enable two or more companion container instances to communicate on behalf of two or more mobile devices. A first mobile device 1008 may provide data 1002 to a first companion container instance 1020. The data 1002 may be provided along with a task and/or software function 1024 as described above. For example, the first mobile device 1008 and the first companion container instance 1020 may execute an image capture application configured to capture images using one or more sensors attached to the first mobile device and provide the capture images to the first companion container instance 1020 for processing. The image capture application may be at least partially implemented as a software function 1024. For example, the processing of the image by the container instance may be implemented as a software function 1024 described above. In another example, the first mobile device 1008 may be configured to capture audio information using a microphone attached to the first mobile device 1008 and provide the captured audio information to the first companion container instance 1020 for processing by the software function 1024. The first mobile device 1008 may transmit information for processing to the service provider over a network, such as a mobile phone network or the Internet. The service provider 1004 may receive the information for processing and direct the information to the appropriate companion container instance as described above.

The first companion container instance 1020 may receive the data 1002 and generate processed data 1006 based at least in part on the received data 1002 from the first mobile device 1008. In some embodiments, the first companion container instance 1020 may execute a plurality of different software functions 1024 associated with the received data 1002 and responsible for processing the received data 1002 in order to generate the processed data 1006. For example, a first software function may be responsible for converting the received data into a format that may be processed by a second software function into processed data 1006. Furthermore, the software function 1024 may be configured such that the processes or threads of the software function 1024 are isolated from one or more other process of the first companion container instance 1020. In some embodiments, the processed data 1006 may be transmitted to one or more other mobile devices, such as the second mobile device 1018 illustrated in FIG. 10. Transmitting the processed data 1006 to the second mobile device may include transmitting the processed data 1006 to the second companion container instance 1022. The first companion container instance 1020 may execute an application or software function configured to transmit data to other companion container instances. In various embodiments, the same software function responsible for processing the data 1002 or to generate the processed data 1006 is responsible for transmitting the processed data to the other companion container instances. In yet other embodiments, the companion container instances may include an agent configured to transmit and receive data between companion container instances.

The first companion container instance 1020 may provide the processed data 1006 to the second companion container instance 1022. The second companion container instance may receive the processed data on behalf of the second mobile device 1018. In some embodiments, the second companion container instance 1022 may perform additional processing of the data from the first companion container instance 1020. For example, the second companion container instance 1022 may, utilizing one or more software functions, decrypt the received data or may decompress the received data. Once the second companion container instance 1022 has received the processed data 1006, the second companion container instance 1022 may provide the processed data 1006 to the second mobile device 1018. Providing the processed data 1006 to the second mobile device 1018 may include transmitting a notification to the second mobile device, the notification enabling the second mobile device 1018 to obtain the processed data 1006, or transmitting the processed data 1006 directly to the second mobile device 1018.

Additionally, various rules and/or events may be defined within a companion container instance, and the rules may determine the behavior of the companion container instance based on certain inputs. For example, the first mobile device 1008 may provide data 1002 to the first companion container instance 1020. The data 1002 may include GPS coordinates or information corresponding to a network the first mobile device 1008 is connected to. Furthermore, the first companion container instance 1020 may include a rule that specifies a particular operation if the data 1002 has a certain value. For example, the rule may indicate that if the mobile device enters a particular location, a notification is transmitted to the second mobile device 1018. Furthermore, the rules may include one or more complex events. For example, a rule may indicate a particular operation of the companion container instance if m of n rules are satisfied (m and n being positive integers), such as "start playing music if 7 of my 10 friends show up to the party." The companion container instances may be configured to distribute the data 1002 among a set of other companion container instances in order to determine if a particular rule has been satisfied. Returning to the example above, the companion container instances associated with the "friends" may be configured to provide the first companion container instance 1020 with location information corresponding to the mobile device assigned to the companion container instances associated with the "friends."

In another example, data 1002 may be aggregated from multiple mobile devices to a particular companion container instance. For example, data 1002 from employees' mobile devices may be aggregated in a companion container instance assigned to an employer's mobile device. The companion container instance may use the data 1002 to notify the employer that a particular employee has entered a particular location. Similarly, an advertiser may use the data 1002 obtained by a companion container instance to determine the location of an operator of a mobile device assigned to the companion container instance and provide location based on location aware advertisements. Furthermore, the companion container instance may collect data 1002 from the mobile device and may provide the data to one or more services the mobile device is configured to utilize. For example, the companion container instance may provide location data to the companion container instance, and the companion container instance may update a social networking service, a maps service, and a public transit service. This may eliminate the need for the mobile device to send location data to multiple services and may reduce the amount of network traffic to and from the mobile device.

Figure 11:
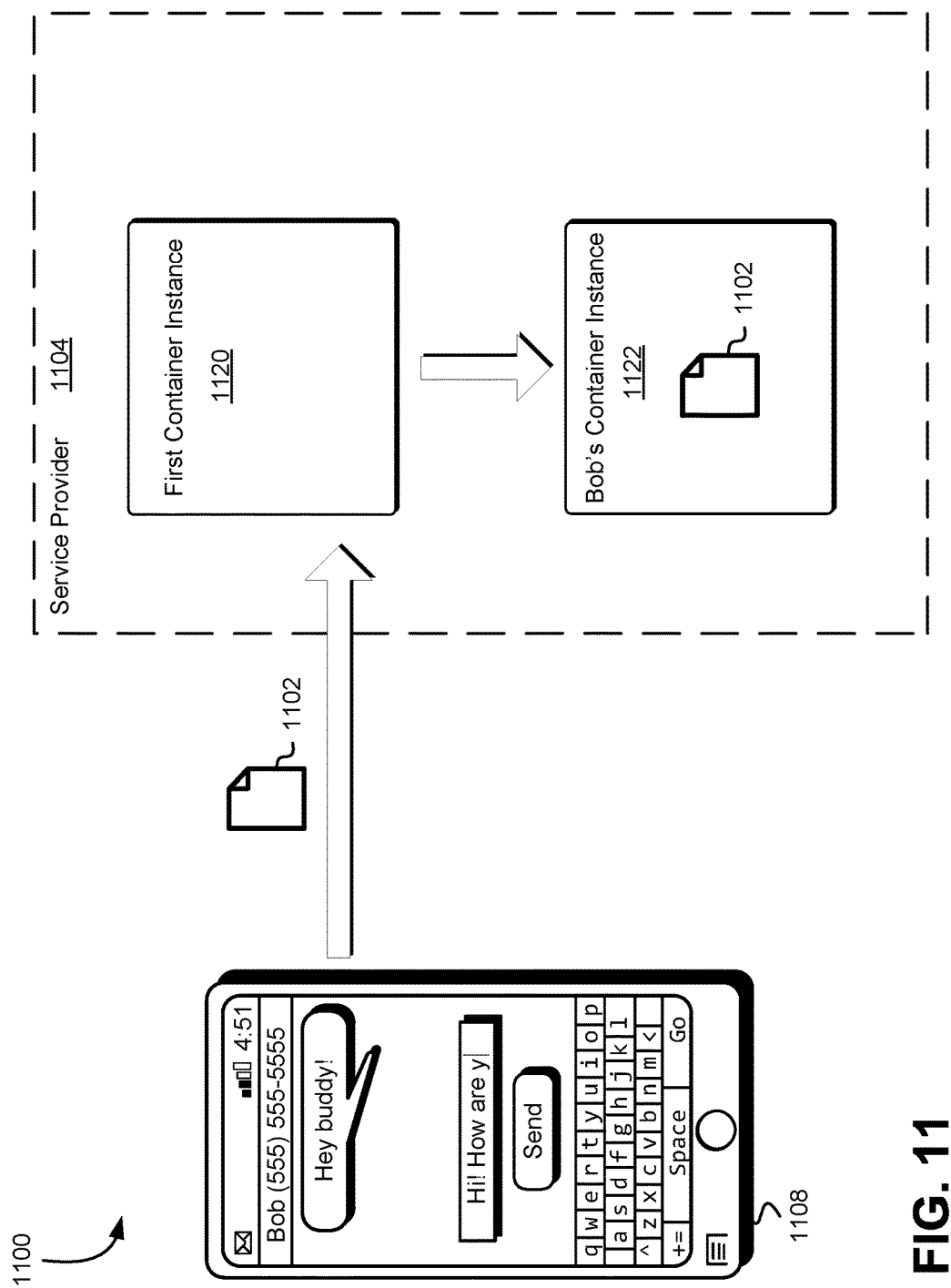
FIG. 11 is a diagram illustrating an environment for communicating between container-backed mobile devices in accordance with at least one embodiment.

FIG. 11 illustrates an environment 1100 in which a service provider 1104 may enable two or more companion container instances to communicate on behalf of two or more mobile devices. A mobile device 1008 may provide a message 1002 or other data to a companion container instance 1120 as described above. The message 1102 may be generated by an application executed on the mobile device 1112, which is configured to receive input from a user through an input device connected to the mobile device 1112. As illustrated by FIG. 11, for example, the mobile device may include a touchscreen on which a keyboard is displayed that enables a customer to generate the message 1102. Furthermore, as illustrated by FIG. 11, the application may be configured such that the message may be directed to another mobile device by using a telephone number associated with the other mobile device. Once the customer selects the "send" button, which may be a graphical user interface element of the application executed by the mobile device 1112, the mobile device 1112 may transmit the message 1102 included in a task or software function to the service provider 1104.

In some embodiments, once the message 1102 is received, the companion container instance may process the message 1102 using a software function as described above. Furthermore, the message may include additional information configured to enable the companion container instance to direct the message 1102 to one or more intended recipients. For example, the message 1102 may include information corresponding to the intended recipients such as a telephone number, IP address, DNS entry, name, serial number, or other information configured to identify a recipient. The companion container instance 1120 may then utilize the additional information to determine location information usable to transmit the message 1102 to the intended recipients. For example, the companion container instance may query the container service for an IP address associated with one or more telephone numbers included in the message 1102. The container service may obtain the information from one or more records in a database as described above and provide the obtained information to the companion container instance 1120. In some embodiments, the request interface described above may determine the companion container instance intended to receive the message 1102 and provide companion container instance 1120 with information configured to locate the intended recipients based at least in part on the message. Returning to FIG. 11, the companion container instance 1120 may transmit the message 1102 to Bob's companion container instance 1122, based at least in part on information contained in the message 1102 indicating "Bob" as the intent recipient of the message 1102.

Figure 12:
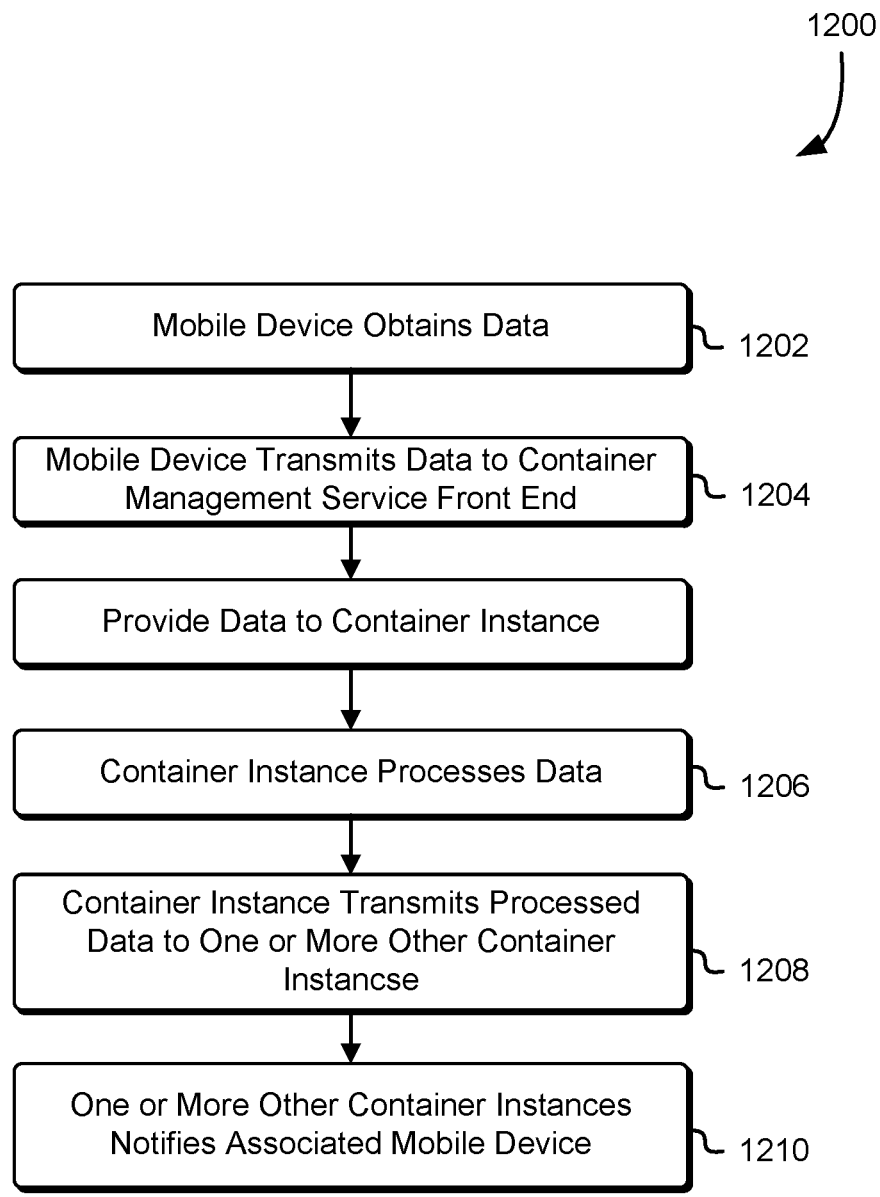
FIG. 12 is an illustrative example of a process for communicating with a container-backed mobile device in accordance with at least one embodiment.

FIG. 12 shows an illustrative example of the process 1200 that may be used to enable communication between a mobile device and corresponding companion container instance. The process 1200 may be performed by any suitable system, such as the mobile devices and corresponding companion container instances as described above. Returning to FIG. 12, in an embodiment, the process 1200 includes obtaining data by a mobile device 1202. Obtaining data may include receiving user input through an input device or capturing information using one or more sensors of the mobile device. The mobile device may also obtain information from one or more other computer systems. For example, the mobile device may obtain information from a webserver or other server over a network such as the Internet. The mobile device may then transmit the obtained data to the mobile device's container service front end 1204. As described above, the mobile device may capture information from one or more sensors and transmit the information to the request interface of the service provider or container service.

The front end or interface of the container service may then transmit the data to the companion container 1206. For example, the front end determines, based at least in part on a scheduler described above, a companion instance with sufficient capacity and resources to process the data and provide the data to the container instance. The obtained data may include a task or software function indicating an operation or function to be performed with the data. For example, the data may include a task definition indicating a software function to be executed in order to encrypt information included in the data. In another example, the data may include a task indicating a particular software function configured to covert the data into a format that another mobile device may interact with. The companion container instance may then process the data 1208, as described above in connection with FIG. 10. The companion container instance may determine, based at least in part on the received data, one or more companion container instances to which to transmit the processed data.

The companion container instance may then transmit the processed data to one or more other companion container instances 1210. For example, as illustrated in FIG. 11, the companion container instance may determine one or more other companion container instances to transmit the message to, based at least in part on the message, and transmit the message to the determined companion container instances. Once received by the one or more other companion container instances, the one or more other companion container instances may transmit a notification to the corresponding mobile devices 1212. In numerous variations of process 1200, the companion container instance may transmit the processed data back to the mobile device responsible for providing the data to the companion container instance. In another variation to process 1200, the companion container instance may not process the received data and may simply determine one or more other companion container instances to which to transmit the data.

Figure 13:
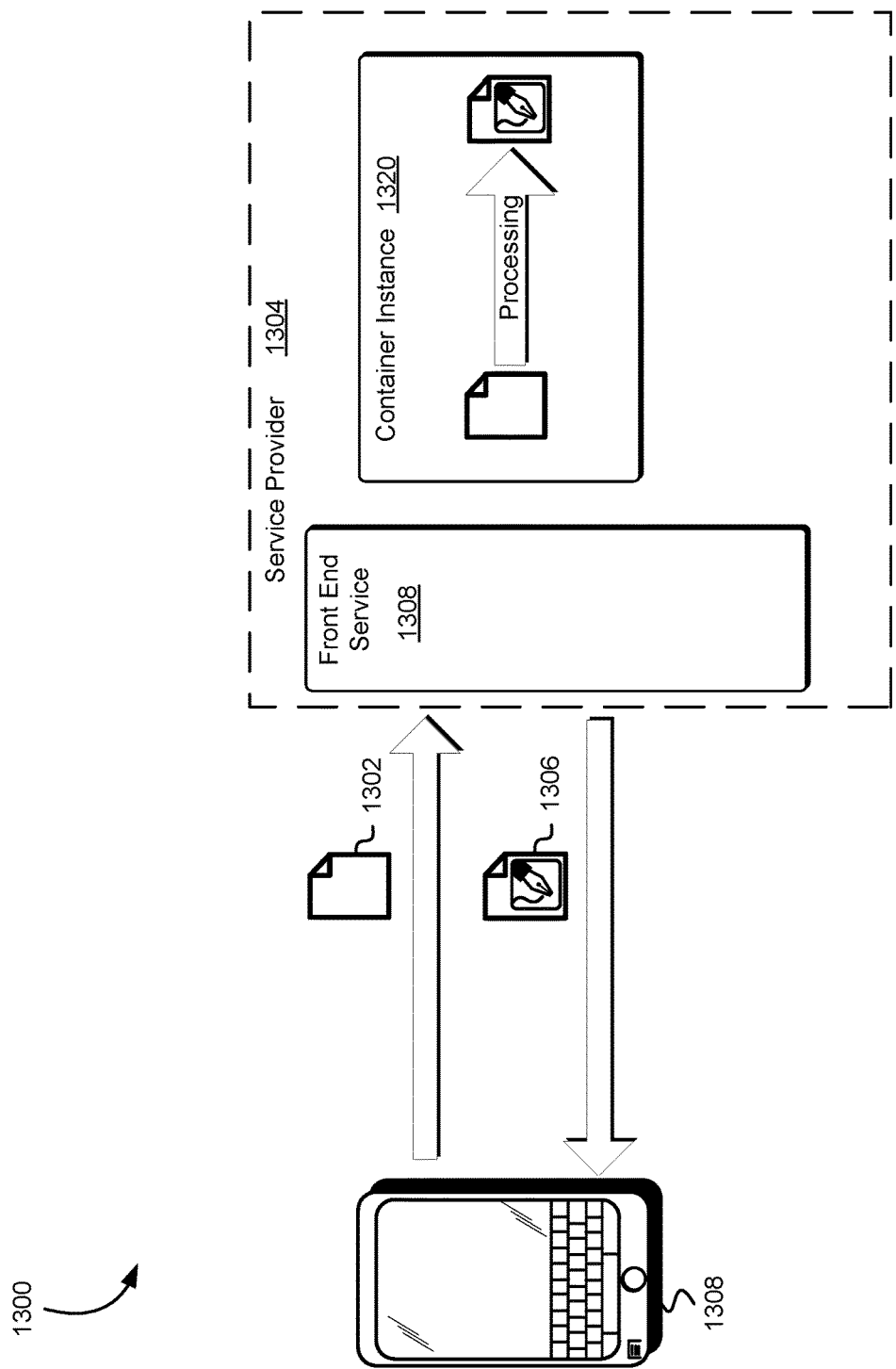
FIG. 13 is a diagram illustrating an environment for communicating between container-backed mobile devices in accordance with at least one embodiment.

FIG. 13 illustrates an environment 1300 in which a service provider 1304 may enable a companion container instance 1320 to process data on behalf a mobile device 1308. The mobile device 1308 may provide data 1302 to a front end service 1314. The front end service 1324 may be responsible for directing the data 1302 to the appropriate service of the computing resource service provider 1304, such as the container service. For example, the mobile device 1308 and the companion container instance 1320 may execute an image capture application configured to capture images as described above. Furthermore, the image capture application may contain at least two portions: a first portion configured to execute on the mobile device 1308, and a second portion configured to execute on the companion container instance 1320. The companion container instance 1320 may process the received data 1302 and generate processed data 1306 as described above. The companion container instance 1320 may provide the mobile device 1308 with a notification once the companion container instance has completed processing the data 1302 and generated the processed data 1306.

In some embodiments, the companion container instance 1320 may transmit the processed data 1306 directly to the mobile device 1308. If a notification is first sent, the companion container instance 1320 may wait for the mobile device 1308 to request the processed data 1306 before transmitting the processed data 1306 to the mobile device. In various embodiments, the companion container instance 1320 is configured to store the processed data 1306 in a storage device. In such embodiments, the companion container instance 1320 may provide a URL or other information configured to enable the mobile device 1308 to obtain the data from the storage device. The companion container instance 1320 may also determine whether to transmit the processed data 1306 to the mobile device 1308, or to perform one or more other operations described above. For example, if the mobile device 1308 is low on battery power, the companion container instance 1320 may store the processed data 1306 in a storage device and provide the mobile device with a notification. In another example, if the mobile device 1308 has a slow or intermittent connection, the companion container instance 1320 may compress or otherwise reduce the size of the processed data 1306 before transmitting the data to the mobile device 1308.

Figure 14:
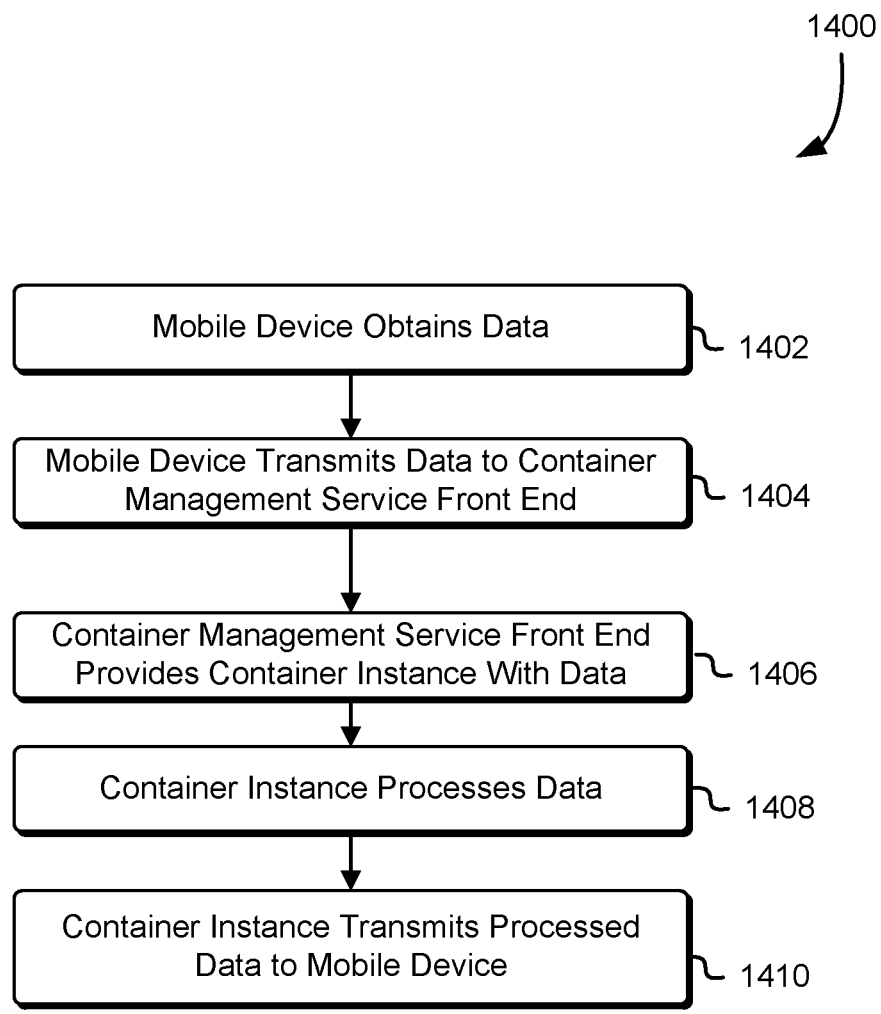
FIG. 14 is an illustrative example of a process for communicating with an container-backed mobile device for the purpose of processing data in accordance with at least one embodiment.

FIG. 14 shows an illustrative example of the process 1400 that may be used to enable a mobile device to utilize a companion container instance to perform various operations. The process 1400 may be performed by any suitable system, such as the mobile devices and corresponding companion container instances as described above. Returning to FIG. 14, in an embodiment, the process 1400 includes obtaining data by a mobile device 1402. Obtaining data may include receiving user input through an input device or capturing information using one or more sensors of the mobile device. The mobile device may also obtain information from one or more other computer systems. For example, the mobile device may obtain information from a webserver or other server over a network such as the Internet. Additionally, the mobile device may perform some processing on the obtained data, or may generate the obtained data by performing some processing. For example, the mobile device may start processing an image and determine to shift the processing of the image to the companion container instance based at least in part on one or more operating attributes of the mobile device, such as processing power, amount of available memory, size of the image, battery power availed to the mobile device, or any other information suitable in determining whether to shift processing to the companion container instance.

The mobile device may then transmit the obtained data to the container service front end 1408. The container service front end 1408 may then determine a companion container instance to process the data 1406. The companion container instance may then process the data 1408 as described above in connection. For example, the companion container instance may enhance an image captured by the mobile device or cause the obtained data to be stored in a storage device. The companion container instance may then transmit the processed data to the mobile device 1410. This may include transmitting a notification to the mobile device as described above in FIG. 13. The processed data may be transmitted to the mobile device as well as one or more other companion container instances associated with other mobile devices.

Figure 15:
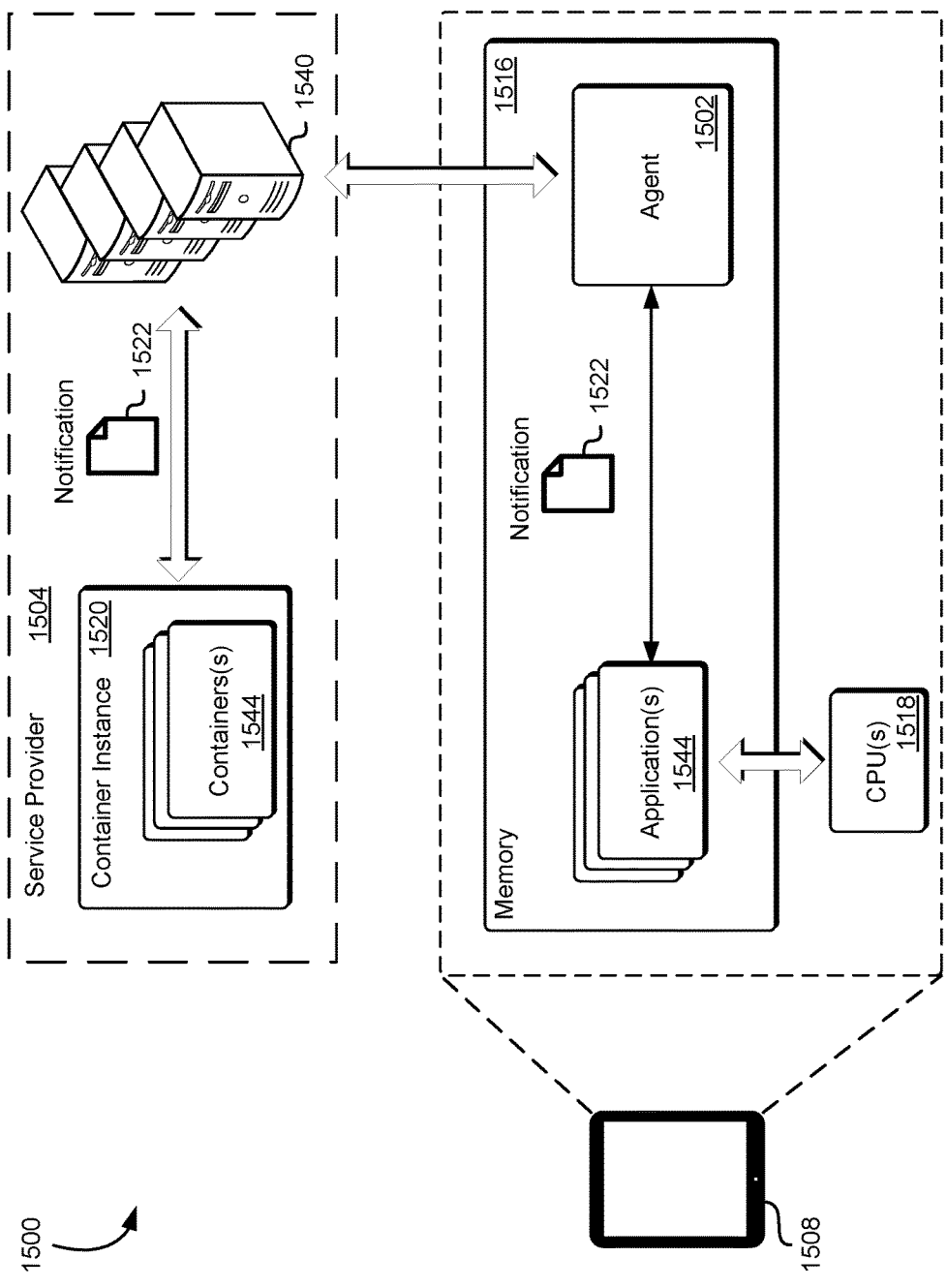
FIG. 15 is a diagram illustrating an environment for communicating with a container backed mobile device in accordance with at least one embodiment.

FIG. 15 illustrates an example environment 1500 where a companion container instance 1520, as well as the associated code running thereon (e.g., software functions 1542), may provide a notification 1522 utilizing, at least in part, inter-process communications to communicate between an agent 1502 and one or more applications 1544. A mobile device 1508 may contain the one or more applications 1544 in memory 1516. Additionally, the companion container instance 1520 may also contain one or more software functions 1542 corresponding to the one or more applications 1544 or portions therefor. The companion container instance 1520 may be executed by system hardware 1540 operated by a service provider 1504, as described above. The mobile device 1508 may be any suitable computer system as described above. The agent 1502 may be loaded into memory 1516 of the mobile device 1508 using a variety of different techniques. For example, the agent 1502 may be transmitted to the mobile device 1508 over a network connection and loaded into memory by a network interface of the mobile device 1508. Additionally, the agent 1508 may be included in the operating system loaded into the memory 1516 of the mobile device 1508. The companion container instance 1520 may receive a notification 1522 on behalf of the mobile device 1508, as described above. For example, a news application executed by the companion container instance 1520 as a software function 1542 may receive a notification from server including the latest news headlines. The notification 1522 may be transmitted by the companion container instance 1520 as a result of executing the software function 1542 to the agent 1502.

The agent 1502 may include executable instructions that, when executed by one or more processors 1518 (also referred to as CPUs or central processing units) of the mobile device 1508, cause the mobile device 1508 to perform various operations associated with the companion container instance 1520 and/or software functions 1542, the one or more applications loaded in memory 1516, or with other hardware of the mobile device 1508. For example, the agent 1502 may cause a notification to be displayed by a display device connected to the mobile device 1508. The agent 1502 may receive the notification 1522 and provide the notification 1522 to the one or more applications 1504. Returning to the example above, the agent 1502 may transmit the notification 1522 to the news application executed by the mobile device 1508.

As shown in FIG. 15, the mobile device 1508 includes at least the memory 1516 and one or more processors 1518. The mobile device 1508 may include one or more processors of a variety of different processors, such as CPUs or graphics processing units (GPUs), that provide computing functionality to the testing device. Examples of processors include those utilizing a complex instruction set computing (CISC) architecture, such as the x86 CPU, and others that utilize a reduced instruction set computing (RISC) architecture, such as the advanced RISC machine (ARM) CPU. The mobile device 1508 may include additional hardware not illustrated in FIG. 15 for simplicity. The data stored in the memory 1516 (programs, code modules, instructions) that, when executed by one or more processors 1518, may provide the functionality of one or more embodiments of the present disclosure. These application modules or instructions may be executed by the processors 1518. The memory 1516 may additionally provide storage for other software of the mobile device 1508, such as an operating system. The memory 1516 may include random access memory, read only memory, static memory, dynamic memory, or any other storage mechanism suitable for storing executable code.

The mobile device 1508 may further include a network interface configured to communicate using any type of communication protocol, including a cellular wireless communications protocol, such as fourth generation (4G) communications, or long term evolution (LTE®), a wireless local area network (WLAN) communications protocol, such as an Institute for Electrical and Electronics Engineers (IEEE) 802.11, 802.16 or 802.21 communication protocol, or short range communications protocol, among others. The mobile device 1508 may further be equipped with a global positioning system (GPS) circuitry that enables locating the device. The mobile device 1508 may further be configured to provide GPS information to the companion container instance 1520, which may in turn provide the information to the one or more software functions 1542 included in the companion container instance 1520. In some embodiments, the one or more software functions 1542 may be configured to communicate with one or more other computer systems. For example, the mobile device 1508 and companion container instance 1520 may include navigation software functions configured to provide driving directions based at least in part on the GPS coordinates on the mobile device 1508. The navigation application may provide the GPS coordinates to a server configured to calculate a route based at least in part on the received coordinates.

The mobile device 1508, companion container instance 1520, and one or more other computer systems may communicate using one or more computer system ports. A computer system port is a network communications endpoint under the control of a host computer system operating system. A port may be associated with an Internet Protocol (IP) address such as an IPv4 or IPv6 address, a port number assigned by the host operating systems, a port type also assigned by the host operating system, and/or other such computer system associations. Ports may be used in modern computer systems to allow multiple services to share a single connection to a network by allowing those services to be uniquely associated with certain ports, thereby forwarding all port-addressed network connections to the uniquely associated services. Common port types include, but are not limited to, user datagram protocol (UDP) ports and transmission control protocol (TCP) ports (also referred to as transmission control protocol/Internet protocol (TCP/IP) ports). A port may be used by a host computer system to receive connections, to receive data, to initiate connections, to wait for processes in other systems to complete, or to receive and process commands or for a combination of these and/or other such computer system functionality. Certain ports of a host computer system may be well known to allow remote computer systems to access certain well-known services on a host computer system. For example, the companion container instance 1520 may receive connections on TCP port 80 for hypertext. In another example, the companion container instance 1520 may listen on various ports for notifications on behalf on the mobile device 1508. This may include monitoring a communication channel established in order to communicate with the mobile device 1508.

Figure 16:
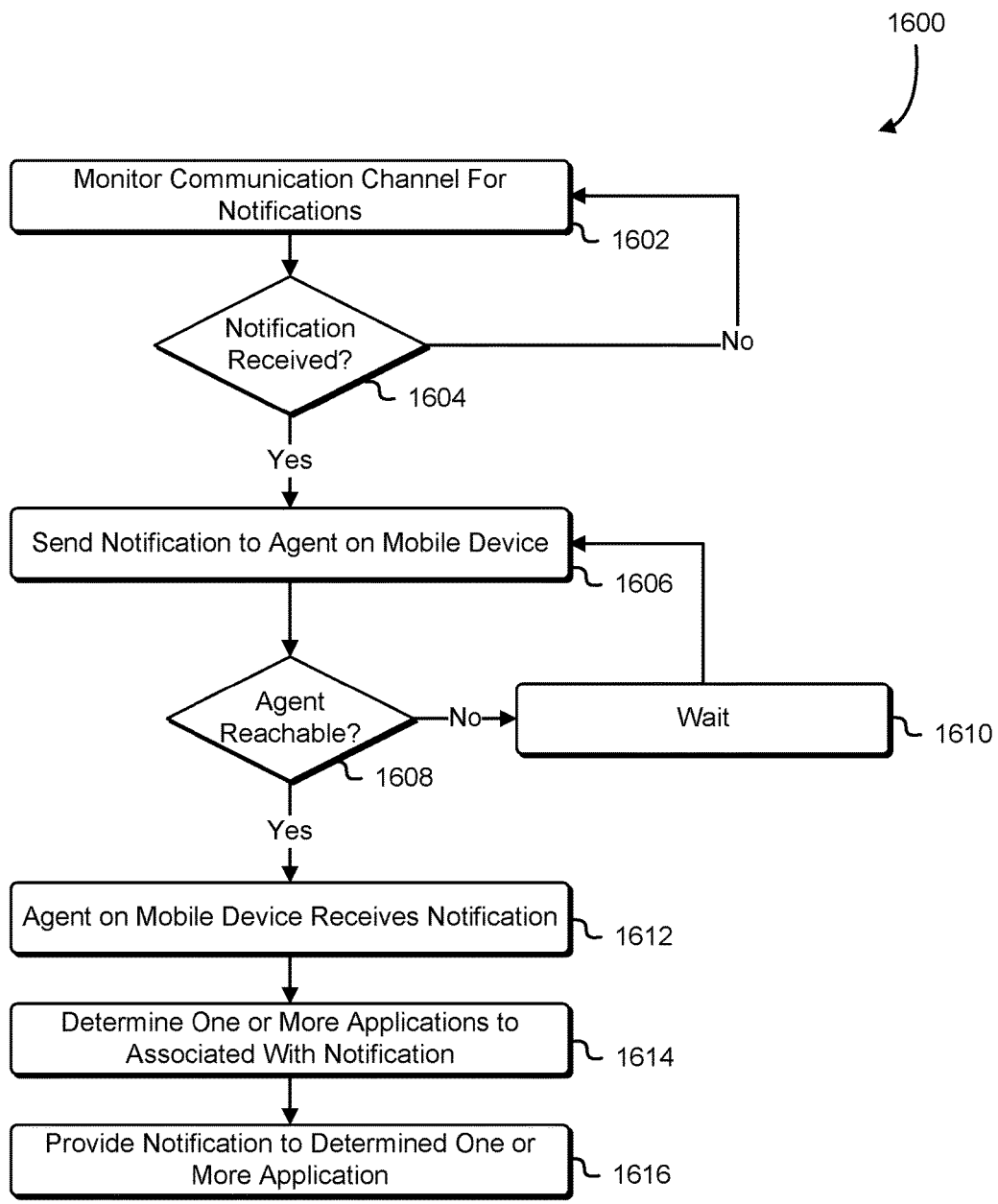
FIG. 16 is an illustrative example of a process for providing a notification to a container-backed mobile device in accordance with at least one embodiment.

FIG. 16 shows an illustrative example of the process 1600, which may be used to receive notification at a companion container instance and provide notifications to a mobile device. The process 1600 may be performed by any suitable system, such as the mobile devices and corresponding companion container instances as described above. Returning to FIG. 16, in an embodiment, the process 1600 includes monitoring a communications channel for notifications 1602. The companion container instance, container service, and/or software function may monitor one or more ports, as described above, in order to receive notification on behalf on the mobile device. The notification may be received from other companion container instances, mobile devices, or other computer systems. For example, the notification may include an e-mail message transmitted from an e-mail server. In another example, the notification may include a Short Message Service (SMS) text message from another mobile device.

If no message is received on the monitored communications channel 1604, the companion container instance may continue to monitor the channel 1602. If a message is received 1604, the companion container instance may cause a notification to be transmitted to an agent application executed by the mobile device 1606. If the agent is unreachable 1608 (e.g., the agent provides no response), the companion container instance may wait 1610 and re-transmit the notification to the agent 1606. If the agent is reachable, the agent may receive the notification 1612 and provide an indication to the companion container instance that the notification has been received. The agent may then determine one or more applications associated with the received notification 1614. For example, the notification may include an identifier of the applications associated with the notification. The agent may then provide the notification to the determined application 1616. For example, the application may register with the agent to receive notification through an inter-process communication channel.

Figure 17:
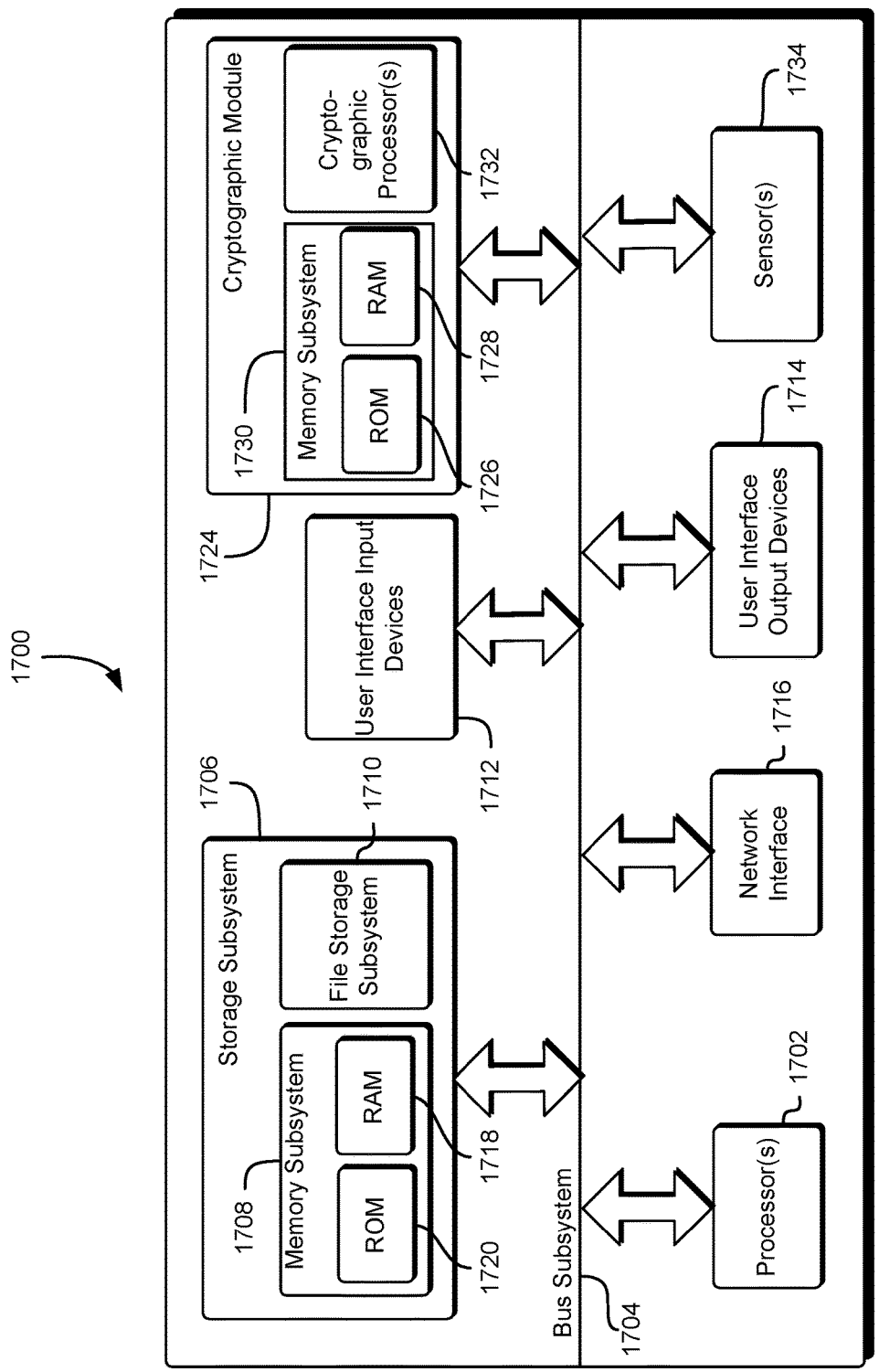
FIG. 17 shows an illustrative example of components of a computing device in accordance with at least one embodiment.

FIG. 17 is an illustrative, simplified block diagram of an example mobile device 1700 that may be used to practice at least one embodiment of the present disclosure. In various embodiments, the device system 1700 may be used to implement any of the systems illustrated herein and described above. For example, the device system 1700 may be used to implement a mobile device and other applications, such as a browser application, in accordance with various embodiments. As shown in FIG. 17, the device 1700 may include one or more processors 1702 that may be configured to communicate with and are operatively coupled to a number of peripheral subsystems via a bus subsystem 1704. These peripheral subsystems may include a storage subsystem 1706, comprising a memory subsystem 1708 and a file storage subsystem 1710, one or more user interface input devices 1712, one or more user interface output devices 1714, a network interface subsystem 1716, a cryptographic module 1724, comprising a memory subsystem 1730, and one or more cryptographic processors 1732. The peripheral subsystems may also include one or more sensors 1734 in addition to sensors of input devices 1712. Such sensors may include, but are not limited to, GPS sensors, accelerometers, temperature sensors and others.

The bus subsystem 1704 may provide a mechanism for enabling the various components and subsystems of device system 1700 to communicate with each other as intended. Although the bus subsystem 1704 is shown schematically as a single bus, alternative embodiments of the bus subsystem may utilize multiple busses.

The network interface subsystem 1716 may provide an interface to other device systems and networks. The network interface subsystem 1716 may serve as an interface for receiving data from and transmitting data to other systems from the device system 1700. For example, the network interface subsystem 1716 may enable transmission of application data and other information, such as electronic requests to access a system (e.g., receive a webpage) and may enable receipt of responses to the requests, such as webpages or other information. The network interface subsystem 1716 may also facilitate the receipt and/or transmission of data on other networks, such as an organization's intranet and/or other networks described below.

The user interface input devices 1712 may include one or more buttons, a keyboard, keypad, pointing devices, such as an integrated mouse, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in consuming applications, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 1700.

User interface output devices 1714, if any, may include a display subsystem, or non-visual displays, such as audio and/or tactile output devices, etc. Generally, the output devices 1714 may invoke one or more of any of the five senses of a user. The display subsystem may be a flat-panel device, such as a liquid crystal display (LCD), light emitting diode (LED) display, or a projection or other display device. In general, use of the term "output device" is intended to include all possible types of devices and mechanisms for outputting information from the device system 1700. The output device(s) 1714 may be used, for example, to present user interfaces to facilitate user interaction with applications performing processes described herein and variations therein, when such interaction may be appropriate. While a device 1700 with user interface output devices is used for the purpose of illustration, it should be noted that the device 1700 may operate without an output device, such as when the device 1700 is operated in a server rack and, during typical operation, an output device is not needed.

The storage subsystem 1706 may provide a computer-readable storage medium for storing the basic programming and data constructs that may provide the functionality of at least one embodiment of the present disclosure. The applications or components thereof (programs, code modules (i.e., programming modules), instructions) that, when executed by one or more processors, may provide the functionality of one or more embodiments of the present disclosure and may be stored in the storage subsystem 1706. These application modules or instructions may be executed by the one or more processors 1702. The storage subsystem 1706 may additionally provide a repository for storing data used in accordance with the present disclosure. The storage subsystem 1706 may comprise a memory subsystem 1708 and a file/disk storage subsystem 1710.

The cryptographic module 1724, which may be a trusted platform module (TPM), includes a memory subsystem 1730, including a main random access memory (RAM) 1728 for storage of instructions and data during program execution and a read only memory (ROM) 1726, in which fixed cryptographic information may be stored, such as a hardware secret stored securely within the device 1700 so as to be non-exportable (i.e., inaccessible through any call to the cryptographic module 1724). The cryptographic module 1724, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 1700 may also store cryptographic keys in RAM 1728 and/or processor registers for temporary cryptographic processing. The cryptographic information stored in memory may be used in combination with cryptographic information obtained via the network interface 1716 and/or one or more of the user interface input devices 1712. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one-way functions and include, but are not limited to, algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 1724 may be configured to collectively perform various operations used generating cryptographically verifiable information for authentication objects.

As noted above, in various embodiments of the present disclosure, hardware secrets are securely stored within the cryptographic module 1724. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF, and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 18:
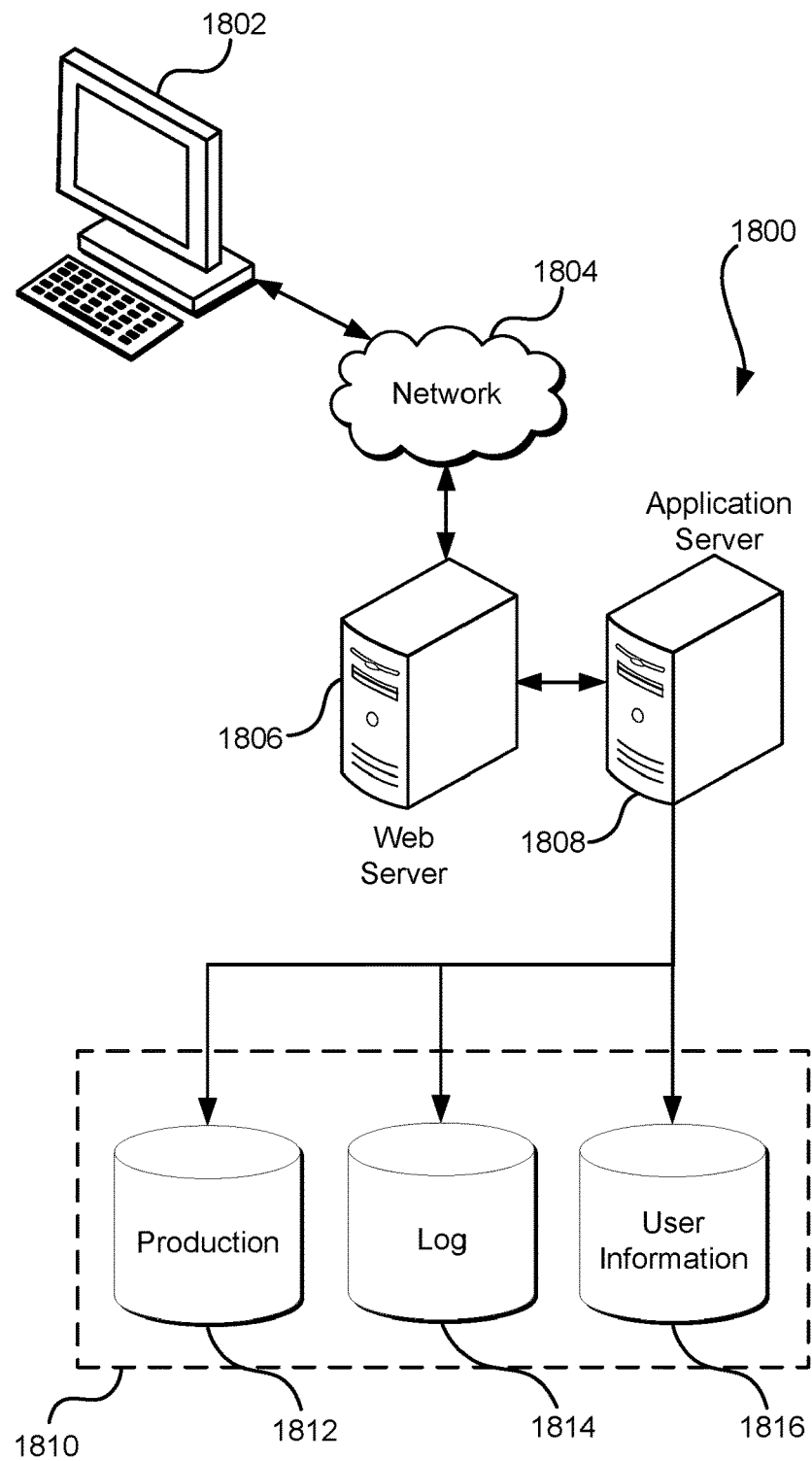
FIG. 18 illustrates an environment in which various embodiments can be implemented.

FIG. 18 illustrates aspects of an example environment 1800 for implementing aspects in accordance with various embodiments. As will be appreciated, although a web-based environment is used for purposes of explanation, different environments may be used, as appropriate, to implement various embodiments. The environment includes an electronic client device 1802, which can include any appropriate device operable to send and/or receive requests, messages or information over an appropriate network 1804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1806 for receiving requests and serving content in response thereto, although for other networks an alternative device serving a similar purpose could be used as would be apparent to one of ordinary skill in the art.

The illustrative environment includes at least one application server 1808 and a data store 1810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1802 and the application server 1808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1810 can include several separate data tables, databases, data documents, dynamic data storage schemes and/or other data storage mechanisms and media for storing data relating to a particular aspect of the present disclosure. For example, the data store illustrated may include mechanisms for storing production data 1812 and user information 1816, which can be used to serve content for the production side. The data store also is shown to include a mechanism for storing log data 1814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update or otherwise process data in response thereto. The application server 1808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    assigning a companion container instance to a device such that as a result of being assigned to the device, the companion container instance executes software functions on behalf of the device based at least in part on a task definition, which identifies a set of software functions that perform a task on behalf of the device and specifies an allocation of resources to the set of software functions;
    receiving, from the device, the task definition;
    processing the task definition by at least:
        obtaining a software function, wherein the software function executes within the companion container instance such that the software function is allocated with resources in accordance with the allocation of resources specified in the task definition, wherein the software function is executed in a software container in isolation from other software functions of the set of software functions; and
        providing the device with a result of launching the software function.

2. The computer-implemented method of claim 1, wherein the result of launching the software function further comprises processing data from the device.

3. The computer-implemented method of claim 1, wherein performing the task on behalf of the device further comprises:
    monitoring a communication channel for a notification, during an interval of time in which the device lacks connectivity to one or more networks;
    performing the task on behalf of the device; and
    transmitting a result of performing the task to an agent executed by the device.

4. The computer-implemented method of claim 1, wherein receiving the task definition further comprises transmitting a message to a second device, wherein the second device performs the task on behalf of the device.

5. A system, comprising:
one or more processors; and
memory with instructions that, as a result of being executed by the one or more processors, cause the system to at least:
assign a companion container instance to a device wherein as a result of the assignment, the companion container instance at least runs software functions on behalf of the device based at least in part on a task definition, which identifies a set of software functions that causes performance of a task on behalf of the device using resources of a computer resource service provider;
receive, from the device, the task definition;
execute at least a subset of software functions of the set software functions indicated in the task definition to perform the task on behalf of the device, wherein the subset of software functions are executed in one or more software containers in at least partial isolation of one another; and
provide a result of the executed subset of software functions to the device.

6. The system of claim 5, wherein the memory further includes instructions that, as a result of being executed by the one or more processors, cause the system to:
obtain, by the companion container instance, data captured by one or more sensors of the device; and
provide, to the device, processed data based at least in part on the obtained data.

7. The system of claim 5, wherein the memory further includes instructions that, as a result of being executed by the one or more processors, cause the system to at least:
obtain, by the companion container instance, a data object indicated in the task definition and stored by a storage service of a computing resource service provider, wherein the storage service operates a storage device associated with the companion container instance; and
provide, to the device, processed data based at least in part on the obtained data.

8. The system of claim 5, wherein the instructions that cause the system to execute at least the subset of software functions of the set software functions further include instructions that, as a result of being executed by the one or more processors, cause the system to at least:
listen on a first port for a notification indicating the device; and
wherein providing the result of the executed subset of software function to the device further comprises providing the notification to the device.

9. The system of claim 5, wherein the system further includes a database containing a record associating the companion container instance and the device, the record further containing information indicating a location of the companion container instance.

10. The system of claim 5, wherein the memory further includes instructions that, as a result of being executed by the one or more processors, cause the system to at least:
obtain information corresponding to a state of the device; and
provide the obtained information to one or more other computer systems.

11. The system of claim 5, wherein the instructions that cause the system to receive, from the device, the task definition further include instructions that, as a result of being executed by the one or more processors, cause the system to receive a data object from the device, where the data object is indicated in the task definition.

12. The system of claim 5, wherein the memory further includes instructions that, as a result of being executed by the one or more processors, cause the system to at least:
determine, based at least in part on state of the device, to shift at least one operation of an application implemented by the device to the companion container instance; and
cause the companion container instance to perform the at least one operation of the application based at least in part on receiving a second task definition indicating with the at least one operation of the application and a particular software functions of the set of software functions corresponding to the at least one operation of the application.

13. A non-transitory computer-readable storage medium having stored thereon executable instructions that, as a result of being executed by one or more processors of a computer system, cause the computer system to at least:
receive, from a device, a task definition which identifies a set of software functions that performs a task on behalf of the device and a set of resources required to execute the task, the set of resources maintained by a computing resource service provider;
determine a companion container instance that is registered to the device and that includes the set of resources involved in execution of the task, wherein after the companion container instance is registered to the device, the companion container instance implements the set of software functions in response to the received task definition;
execute at least a subset of software functions of the set software functions, wherein the subset of software functions are executed in one or more software containers in at least partial isolation of one another; and
provide a result of the executed subset of software functions to the device.

14. The non-transitory computer-readable storage medium of claim 13, wherein the instructions further comprise instructions that, as a result of being executed by the one or more processors, cause the computer system to update a record contained in a database with information corresponding to the companion container instance and the device, the record associating the device with the companion container instance.

15. The non-transitory computer-readable storage medium of claim 13, wherein the instructions further comprise instructions that, as a result of being executed by the one or more processors, cause the computer system to, as a result of executing the subset of software functions, provide a processed data object to the device.

16. The non-transitory computer-readable storage medium of claim 13, wherein the instructions that cause the computer system to determine the companion container instance registered to the device further include instructions that cause the computer system to determine the companion container instance by at least providing a request to a multitenant scheduler service configured to determine the companion container instance from a set of container instances based at least in part on a placement scheme and the task definition.

17. The non-transitory computer-readable storage medium of claim 13, wherein the instructions that cause the computer system to execute the subset of software functions of the set software functions further include instructions that cause the computer system to execute the subset of software functions based at least in part on a command from a container agent, where the container agent is software applications configured to execute within the companion container instance and act as intermediary between the subset of software functions and the device.

18. The non-transitory computer-readable storage medium of claim 13, wherein the instructions that cause the computer system to execute the subset of software functions of the set software functions further include instructions that cause the computer system to:
   determine a second companion container instance associated with a second device; and
   provide data to the second companion container instance, wherein the task definition further comprises information indicating the second device and data to be provided to the second device.

19. The non-transitory computer-readable storage medium of claim 13, wherein the instructions that cause the computer system to execute the subset of software functions of the set software functions further include instructions that cause the computer system to obtain data stored in memory of the device.

20. The non-transitory computer-readable storage medium of claim 19, wherein the instructions that cause the computer system to execute the subset of software functions of the set software functions further include instructions that cause the computer system to store the obtained data with a data storage service configured to provide a logical volume to the companion container instance.

* * * * *